US011616393B2

(12) United States Patent
Youssef et al.

(10) Patent No.: US 11,616,393 B2
(45) Date of Patent: Mar. 28, 2023

(54) LOW-POWER HIGH-FREQUENCY DIRECTIONAL TUNABLE AC MAGNETIC FIELD

(71) Applicant: SAN DIEGO STATE UNIVERSITY (SDSU) FOUNDATION, San Diego, CA (US)

(72) Inventors: George Youssef, Solana Beach, CA (US); Scott Newacheck, La Jolla, CA (US)

(73) Assignee: San Diego State University (SDSU) Foundation, San Diego, CA (US)

( * ) Notice: Subject to any disclaimer, the term of this patent is extended or adjusted under 35 U.S.C. 154(b) by 0 days.

(21) Appl. No.: 17/456,495

(22) Filed: Nov. 24, 2021

(65) Prior Publication Data

US 2022/0166252 A1 May 26, 2022

Related U.S. Application Data

(60) Provisional application No. 63/117,854, filed on Nov. 24, 2020.

(51) Int. Cl.
*H02J 50/00* (2016.01)
*H04B 5/00* (2006.01)
*H02J 50/10* (2016.01)

(52) U.S. Cl.
CPC ............ *H02J 50/005* (2020.01); *H02J 50/10* (2016.02); *H04B 5/0037* (2013.01)

(58) Field of Classification Search
None
See application file for complete search history.

(56) References Cited

U.S. PATENT DOCUMENTS

| | | | | |
|---|---|---|---|---|
| 5,675,252 A | * | 10/1997 | Podney | G01R 33/02 73/862.69 |
| 2007/0003447 A1 | * | 1/2007 | Gleason | G01N 35/1016 422/504 |
| 2012/0236689 A1 | * | 9/2012 | Brown | G10K 11/008 367/138 |

(Continued)

FOREIGN PATENT DOCUMENTS

| | | | |
|---|---|---|---|
| CN | 103022340 A | * 4/2013 | |
| EP | 3249705 A1 | * 11/2017 | H01F 10/32 |

(Continued)

OTHER PUBLICATIONS

Wang et al., "Demagnetization Weakening and Magnetic Field Concentration With Ferrite Core Characterization for Efficient Wireless Power Transfer" IEEE Transactions on Industrial Electronics, vol. 66, No. 3, Mar. 2019, p. 1842-1851.

(Continued)

*Primary Examiner* — Adi Amrany
(74) *Attorney, Agent, or Firm* — Greer, Burns & Crain Ltd.; Gregory P. Einhorn

(57) ABSTRACT

Apparatus for near-field wireless energy transfer. A first layer provides or comprises a piezoelectric phase or a material with or adapted for electromechanical coupling; and a second layer provides or comprises a magnetostrictive phase or a material with or adapted for a magnetomechanical coupling. The second layer is mechanically and/or chemically coupled to the first layer to provide a composite structure.

6 Claims, 29 Drawing Sheets

(56) References Cited

U.S. PATENT DOCUMENTS

| | | | | |
|---|---|---|---|---|
| 2012/0267735 A1* | 10/2012 | Atulasimha | ......... | G11C 11/1675 |
| | | | | 257/E29.323 |
| 2013/0252030 A1* | 9/2013 | Ryu | ........................ | H01L 41/16 |
| | | | | 428/800 |
| 2017/0016088 A1* | 1/2017 | Ott | .......................... | C22B 59/00 |
| 2021/0242394 A1* | 8/2021 | Kim | ........................ | C30B 29/64 |

FOREIGN PATENT DOCUMENTS

| | | | | |
|---|---|---|---|---|
| RU | | 184785 U1 * | 11/2018 | |
| WO | WO-0060369 A1 * | 10/2000 | ............. | G01R 15/20 |
| WO | WO-2020206332 A1 * | 10/2020 | ......... | A61N 1/37223 |

OTHER PUBLICATIONS

Mal et al., "Electric vehicle smart charging and vehicle-to-grid operation" International Journal of Parallel, Emergent and Distributed Systems, 2013 vol. 28, No. 3, 249-265.

Ramesh et al., "Multiferroics: progress and prospects in thin films" Nature Materials | vol. 6 | Jan. 2007, p. 21-29.

Lu et al., "Recent developments in bio-monitoring via advanced polymer nanocomposite-based wearable strain sensors" Biosensors and Bioelectronics 123 (2019) 167-177.

Lu et al., "A Review on the Recent Development of Capacitive Wireless Power Transfer Technology" Energies 2017, 10, 1752, p. 1-30.

Zhai et al., "Giant magnetoelectric effect in Metglas/polyvinylidene-fluoride laminates" Applied Physics Letters 89, 083507 2006.

Gu et al., "Large negative giant magnetoresistance at room temperature and electrical transport in cobalt ferrite-polyaniline nanocomposites" Polymer 143 (2018) 324-330.

Jartych et al., "Magnetoelectric Effect in Ceramics Based on Bismuth Ferrite" Nanoscale Research Letters (2016) 11:234, p. 1-8.

Campi et al., "Wireless Power Transfer Charging System for AIMDs and Pacemakers" IEEE Transactions on Microwave Theory and Techniques, vol. 64, No. 2, Feb. 2016, p. 633-642.

Hu et al., "Comparative assessment of the strain-sensing behaviors of polyactic acid nanocomposites: reduced graphene oxide or carbon nanotubes" Journal of Materials Chemistry C, 2017, 5, 2318.

Wei et al., "An overview of lead-free piezoelectric materials and devices" Journal of Materials Chemistry C, 2018, 6, 12446.

Roes et al., "Acoustic energy transfer: a review" IEEE Transactions on Industrial Electronics, vol. 60, No. 1, Jan. 2013, p. 242-248.

* cited by examiner

LOW-POWER HIGH-FREQUENCY DIRECTIONAL TUNABLE AC MAGNETIC FIELD

CROSS-REFERENCE TO RELATED APPLICATIONS

This application claims priority to U.S. Provisional Patent Application Ser. No. 63/117,854, filed Nov. 24, 2020, which application is incorporated by reference herein in its entirety for all purposes.

STATEMENT OF FEDERALLY SPONSORED RESEARCH

N/A.

FIELD

The present disclosure relates generally to the field of energy generators. Embodiments of the invention relate more particularly to apparatuses, systems, and methods for wireless energy transfer.

BACKGROUND

Devices ranging from common everyday items to life-saving medical instrumentations rely on near-field wireless energy transfer (WET) to receive energy without a physical link to a power source. For example, radio frequency identification (RFID) tags can use WET technology to circumvent the excessive weight and size of batteries or the limited mobility that comes from wires connected to a stationary power supply (S. Mal, A. Chattopadhyay, A. Yang, and R. Gadh, "Electric vehicle smart charging and vehicle-to-grid operation," Int. J. Parallel, Emergent Distrib. Syst., vol. 28, no. 3, pp. 249-265, 2012). Active implanted medical devices such as pacemakers, for instance, can use WET to recharge without necessitating surgery to replace the consumed battery every few years since these implants are inaccessible to a direct connection with an external power source (T. Campi, S. Cruciani, F. Palandrani, V. De Santis, A. Hirata, and M. Feliziani, "Wireless Power Transfer Charging System for AIMDs and Pacemakers," IEEE Trans. Microw. Theory Tech., vol. 64, no. 2, pp. 633-642, February 2016). As another example, with the proliferation of electric-vehicles, bidirectional power transfer based on induction coils is being exploited for vehicle-to-vehicle and vehicle-to-grid charging to extend travel time and reduce time-to-charge (S. Mal et al.).

WET can be particularly advantageous for powering applications where the energy-storage capacities of batteries are limited or insufficient and interconnecting wires are too inconvenient, too dangerous, or in some cases not possible, though other applications are possible.

Current industrial use of short distance WET technology typically works through one of two intermediations: capacitance or induction. Capacitance-based WET can be achieved by applying a large voltage to one electrode to either attract or repel charges on a distant electrode, where the motion of charge energizes an electrical load (e.g., F. Lu, H. Zhang, and C. Mi, "A Review on the Recent Development of Capacitive Wireless Power Transfer Technology," Energies, vol. 10, no. 1752, 2017). Magnetic induction-based WET is driven by the principle of electromagnetism (EM), where electricity and magnetism are bi-directionally coupled. A typical operation for magnetic induction WET includes a power source supplying an alternating current through a conductive coil, which then emanates an alternating magnetic field, as explained by Faraday's law. The alternating magnetic field then imposes an electromotive force on a receiving coil placed a short distance away, as described by Lenz's law, which electromotive force is used to power the isolated electronic device (e.g., M. Wang, J. Feng, Y. Shi, and M. Shen, "Demagnetization Weakening and Magnetic Field Concentration With Ferrite Core Characterization for Efficient Wireless Power Transfer," IEEE Trans. Ind. Electron., pp. 1-1, 2018).

More recent WET methods use acoustic energy transfer. Acoustic energy transfer uses sound waves to carry energy through a solid media to stimulate an electrostrictive material to be converted to electrical charge (e.g., see M. G. L. Roes, S. Member, J. L. Duarte, M. A. M. Hendrix, E. A. Lomonova, and S. Member, "Acoustic Energy Transfer: A Review," IEEE Trans. Ind. Electron., vol. 60, no. 1, pp. 242-248, 2013; H. Wei et al., "An overview of lead-free piezoelectric materials and devices," J. Mater. Chem. C, vol. 6, no. 46, pp. 12446-12467, November 2018; C. Hu et al., "Comparative assessment of the strain-sensing behaviors of polylactic acid nanocomposites: reduced graphene oxide or carbon nanotubes," J. Mater. Chem. C, vol. 5, p. 2318, 2017; Y. Lu, E. K. Wujcik, Y. Lu, M. Chandra Biswas, Z. Guo, and J.-W. Jeon, "Recent Developments in Bio-monitoring via Advanced Polymer Nanocomposite-based Wearable Strain Sensors Carbon Nanotubes for Bisphenol F Epoxy Matrix Composites View project Bio-/Nano-Sensors View project Recent developments in bio-monitoring via advanced," Biosens. Bioelectron., 2018).

However, existing near-field WET technologies based on capacitive, inductive, or acoustic principles are limited due to the underlying physics defining each of them. For instance, in acoustic-based WET, the elastic media carrying the vibrational energy from the transmitter to the receiver plays a major role in the efficacy of the overall device. An attenuative media substantially reduces the power of the ultrasonic wave, resulting in poor overall efficiency. Performance is based on not only the elastic-behavior of the coupling media but also the geometry defined by the planar dimensions to limit edge effects as well as the distance between transducers that may result in self-interference depending on the wavelength (M. G. L. Roes et al.).

A chief disadvantage of capacitor-based WET is a safety concern when high electrical potential forms across the electrode plates to a level that is above the breakdown potential of the dielectric media. In such a case, the space between the electrodes becomes a conductive path for the charges to transfer freely, and in the process can cause serious damage to the device and potentially the operator. Additionally, the receiver of capacitor-based WET must be grounded, limiting implementation; otherwise, an electrode array is necessary on both the transmitter and receiver, making alignment more difficult.

In induction-based WET, electric current, as the driver to produce magnetic fields from the transmitter coil (which is power intensive), scales poorly to the microscale, for instance. It also succumbs to self-induction and Joule heating energy loss.

To mitigate shortcomings of near-field WET technologies, the magnetoelectric effect (ME) is often exploited. Single-material multiferroics intrinsically possess the ME coupling property, but their implementation potential is limited due to, for instance, their diminutive coupling efficiency in environments above freezing temperatures (e.g., R. Ramesh and N. A. Spaldin, "Multiferroics: progress and prospects in thin films," Nat. Mater., vol. 6, no. 1, pp. 21-29, 2007). For example, intrinsic multiferroic material such as bismuth ferrite has been shown to have a peak magnetoelectric coupling at the order of 0.01 V cm$^{-1}$ Oe$^{-1}$ at ambient temperature (e.g., T. Pikula, K. Kowal, J. Dzik, P. Guzdek, and D. Czekaj, "Magnetoelectric Effect in Ceramics Based on Bismuth Ferrite," Nanoscale Res. Lett., vol. 11, no. 234, 2016).

For applicable ME use there has been a focus on multiferroic composites, which couple magnetic and electric energies through a mediated property such as charge or strain (R. Ramesh et al.; H. Gu et al., "Large negative giant magnetoresistance at room temperature and electrical transport in cobalt ferrite-polyaniline nanocomposites," Polymer (Guildf)., vol. 143, pp. 324-330, 2018). Strain-mediated multiferroic composites, for instance, use a piezoelectric capacitor to bi-directionally couple electric fields with strain and a magnetostrictive phase to bi-directionally couple magnetization and strain. Perceived benefits of magnetoelectric based technology include, for example, omnidirectional emission resulting in elimination of alignment such as the case in capacitance technology as well as transferring media tuning through byproduct sound waves yielding enhanced mediation and reduction in transfer media dependence compared to acoustic technology. Different geometry, materials, and bonding interfaces have been heavily investigated in pursuit of higher energy efficiency, lower power consumption, and miniaturization to the nanoscale compared to induction-based technology. Macro-scale multiferroic composites, for instance, have produced high direct ME coupling efficiencies outputting up to 7.2 Vcm$^{-1}$ Oe$^{-1}$ (e.g., see J. Zhai et al., "Giant magnetoelectric effect in Metglas/polyvinylidene-fluoride laminates," Appl. Phys. A, vol. 89, no. 083507, pp. 8-11, 2006).

SUMMARY

Example embodiments of the invention provide, among other things, an apparatus for near-field wireless energy transfer (WET). A first layer provides or comprises a piezoelectric phase, and a second layer provides or comprises a magnetostrictive phase. The second layer is mechanically and/or chemically coupled or joined to the first layer to provide a composite structure. Further example embodiments of such apparatuses are disclosed herein.

Other embodiments provide a system for near-field wireless energy transfer comprising a transmitter and a receiver magnetoelectrically coupled with the transmitter. At least one of the transmitter or receiver (that is, the transmitter, the receiver, or both the receiver and the transmitter) comprises an apparatus for near-field wireless energy transfer according to any of the embodiments disclosed herein.

Other embodiments provide a method for providing near-field wireless energy transfer. A magnetic field is applied to a composite structure according to any of the embodiments disclosed herein. The applied magnetic field induces a change in polarization through strain transduction at an interface between the first and second layers.

Other embodiments provide a method for providing near-field wireless energy transfer. An alternating current (AC) electric field is applied to a composite structure according to any of the embodiments disclosed herein. The applied AC electric field causes the composite multilayer structure to emanate an AC magnetic field via converse magnetoelectric coupling.

Other embodiments provide a method for providing an AC magnetic field using a transducer comprising a composite structure according to any of the embodiments disclosed herein. An example method comprises: grounding the electrode; and applying an AC voltage to the second layer to cause the second layer to generate an electric field to the first layer. The electric field causes the first layer to vibrate, and the vibration of said first layer applies a strain onto the second layer to cause the second layer to create the AC magnetic field.

The details of one or more exemplary embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference in their entireties for all purposes.

Other features and advantages of the invention will be apparent from the following specification taken in conjunction with the following drawings.

DESCRIPTION OF THE DRAWINGS

The drawings set forth herein are illustrative of exemplary embodiments provided herein and are not meant to limit the scope of the invention as encompassed by the claims.

The present disclosure will become more fully understood from the detailed description and the accompanying drawings, wherein.

DETAILED DESCRIPTION

Introduction

Figure 1:
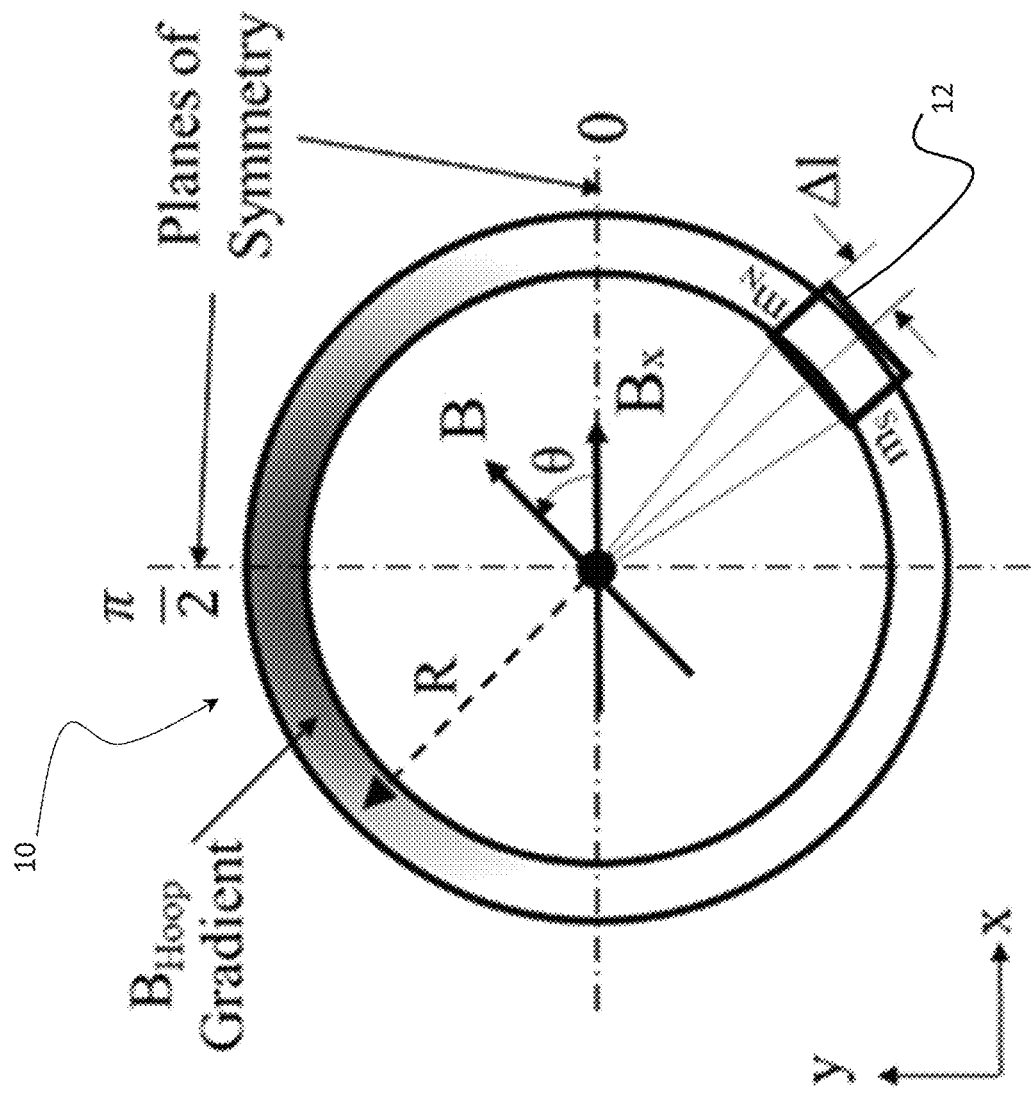
FIG. 1 schematically illustrates a model used to predict magnetic flux in the X-direction (By) at the center of a strain-mediated composite multiferroic wireless energy transfer (SMM-WET) device according to an embodiment. The rectangle on the bottom right quadrant of the ring shown in FIG. 1 is a representation of a straight bar magnet used to formulate the model. The gradient shown only on the top half of the ring represents the magnitude of circumferential magnetization based on experimental results, where the darker shades are related to a large magnetization and lighter regions are low levels of magnetization.

An emanating magnetic field from an electromagnetic coil is proportional to the number of conductor turns, the length, and the current passing through the conductors. Hence, the physical size of the electrical to magnetic field transformer is also a function of the desired magnetic field. However, this paradigm is not believed to be suitable for microscale or nanoscale magnetic field generation, since the resistance of the wire is inversely proportional to the cross-sectional area, which indicates losses of the electrical energy rather than the generation of the desired magnetic field.

Example devices, systems, and methods provided herein can address these and other limitations by, among other features, employing magnetoelectric coupling as opposed to electromagnetism (i.e., current passing through a conductor) to wirelessly provide near-field wireless energy transfer (WET). In magnetoelectric coupling, a material with electromechanical coupling, referred to as a piezoelectric phase, is coupled, for instance, bonded to another material with a magnetomechanical coupling, referred to as a magnetostrictive phase.

Embodiments further provide an AC magnetic field generator with a structure configured to provide an interaction between mechanical strain, electrical field, and magnetic field. Such a structure allows an example generator to be tuned for the strength of the generated magnetic field through the selection of different materials, number, and orientation of one or more layers, and/or the dimension of each layer. The strength and frequency of the AC magnetic field is a function of applied electric field (rather than current as in traditional generators) and geometry. Example AC magnetic field generators can be size independent (contrasted with bulky existing technology), and can be manufactured in any scale (e.g., macroscale to nanoscale).

Some embodiments herein provide, among other things, wireless energy transfer (WET) devices, systems, and methods using strain-mediated multiferroic composite transmitters and receivers. Multiferroic composites can incorporate energies based on electrical, magnetic, and mechanical fields, all of which can be used as transfer mechanisms in capacitance, induction, and acoustic WET systems, respectively. Example apparatuses and methods can exploit a subclass of magnetoelectric composite multiferroics that can bi-directionally couple AC electric fields with AC magnetic fields using mechanical strain as a mediator. AC electric fields, AC magnetic fields, and vibrations are mediums used in capacitance-, induction-, and acoustic-based wireless energy transfer, respectively. Strain-mediated composite multiferroics as provided in example structures are positioned to transform one, two, or all three of these modes of wireless energy transfer.

Strain-mediated composite multiferroic systems are a technologically transformative class of hybrid materials due to their large magnetoelectric coupling at room temperature in comparison to intrinsic single-phase materials, or composites with other forms of mediation such as charge or exchange-bias (e.g., see Palneedi H, Annapureddy V, Priya S and Ryu J 2016 Status and Perspectives of Multiferroic Magnetoelectric Composite Materials and Applications Actuators 5 9). A strain-mediated magnetoelectric composite can be engineered by combining piezoelectric and magnetostrictive materials through mechanical bonding, for example as disclosed in Nan C W, Bichurin M I, Dong S, Viehland D and Srinivasan G, 2008, Multiferroic magnetoelectric composites: Historical perspective, status, and future directions J. Appl. Phys. 103 031101. The magnetoelectric coupling of these composites is said to be bidirectional, whereas the passing of a magnetic field through the composite structure yields a change in polarization, known as the direct magnetoelectric effect (DME). Alternatively, the application of an electric field across the surfaces of the piezoelectric phase causes a change in magnetization, which is termed the converse magnetoelectric effect (CME) and is quantified by the ratio of the magnetic flux generated to the voltage applied.

In strain-mediated composite multiferroics, there are two modes of operations. A magnetic field is applied on the composite structure to induce a change in polarization; i.e., a Joule effect (also known as direct magnetoelectric coupling), through strain transduction at the interface between the bi- or multi-layer structure. Additionally, an alternating current (AC) electric field can be applied on the same bi- or multi-layer composite multiferroics structure resulting in emanation of an AC magnetic field, in what is commonly referred to as Villari effect (or converse magnetoelectric coupling). The Villari effect has conventionally been used in memory and antenna applications.

In some embodiments, a strain-mediated composite multiferroic wireless energy transfer (referred to herein as SMM-WET) system can incorporate any combination of wireless energy carriers. An optimal selection can depend on the conditions of integration.

In some embodiments, a composite ring structure having bi- or multi-layers of piezoelectric and magnetostrictive materials can be used for standalone AC magnetic field generators. Some embodiments herein utilize a composite multiferroics ring structure as a magnetic field generator that requires low power consumption with wide-band frequency output and scale independence. This latter attribute indicates that such example AC magnetic field generators can be used in the macroscale as well as the nanoscale, and any size in between.

Some example inventive SMM-WET apparatuses and methods include a multiferroic stacked laminate composite freely suspended inside a multiferroic ring composite to provide transmitter and receiver elements. An example apparatus includes strain-mediated composite multiferroics in a structure assembled in a concentric cylinder geometry, which enables the generation of a uniform AC magnetic field in response to a low AC voltage stimulus and a direct current (DC) magnetic field. Example apparatuses can include a magnetostrictive alloy cylinder mechanically bonded to and encompassed by a piezoelectric ceramic cylinder with an electrode surrounding the outer surface. The number of layers and/or a stacking sequence can be selected, configured, and/or optimized as needed for particular applications and/or environments.

In an example operation, by grounding the outer surface electrode and applying a voltage to the conductive magnetostrictive ring, a radial electric field is applied to the piezoelectric ring, causing the ring to radially vibrate. The radial vibration of the piezoelectric ring (in one or more of various example vibration modes) applies a strain onto the bonded magnetostrictive ring, which then creates a magnetic field.

Experimental results using example apparatuses and methods illustrate an example displacement transfer from the outer to the inner ring. The voltage can be throttled to linearly control the magnitude of the magnetic field generated by the composite system. In all, applying an AC voltage results in generation of an AC magnetic field. Additionally, applying a steady-state magnetic field can increase the magnitude of the AC magnetic field produced by an example composite system.

Example AC magnetic field generators according to embodiments have been constructed and tested. For illustrating certain inventive features, an example generator was constructed of an outer piezoelectric lead zirconate titanate (PZT) ($Pb[Zr_xTi_{1-x}]O_3$) that was radially polarized with a polarization direction in the negative radial direction. The outer ring was bonded with silver conductive epoxy (though it can be directly bonded or deposited on the outer ring) to an inner magnetostrictive ring made of terbium, dysprosium, and iron alloy, referred to commercially as Terfenol-D, ($Tb_{0.3} Dy_{0.7} Fe_{1.92}$).

Some embodiments disclosed herein leverage the ability of composite multiferroic hollow cylinders to wirelessly transfer energy to and from laminated multiferroic plates using AC magnetic flux as an energy carrier. These composite cylinders in conjunction with laminated plates provide example devices and systems for bi-directional magnetoelectric-based WET. A peak extracted power of ~100 µW is provided by experiments using example embodiments, which power is sufficient to wirelessly power a multitude of small electronic devices.

It will be appreciated that the choice of other piezoelectric materials, adhesives, and magnetostrictive materials may yield the same or similar results regardless of the type or configuration. The concept of operation is then insensitive to the material phase or orientation. In other words, an AC magnetic field will be generated in a given direction based on the boundary condition. Thus, the present invention is not intended to be limited to the materials used in the specific examples disclosed herein.

Other example embodiments herein provide a 1-3 (1-3 arrangement) strain-mediated multiferroic composite structure. Strain-mediated magnetoelectric composites were previously thought to be limited to operate in conditions well below the saturation magnetic field of the magnetostrictive phase. Typically, magnetoelectric composites were only investigated to operate in magnetic fields around 500 Oe or less. This limitation imposes restraints on potential high-field applications for the otherwise excellent technology of magnetoelectricity.

By contrast, example strain-mediated multiferroic composite structures disclosed herein can extend the applicable use of magnetoelectric composites by using a 1-3 concentric cylinder geometry with a positive piezoelectric phase surrounding a positive inner magnetostrictive phase to provide a large and growing magnetoelectric response beyond the saturation magnetic field. The multiferroic composite structure can include an inner magnetorestrictive phase embodied in a terbium, dysprosium, and iron alloy (e.g., Terfenol-D) based concentric cylinder composite, and a positive piezoelectric material to impose a clamping force on the inner magnetostrictive material to reduce the magnetism. As explained herein, the allowance of a high-magnetic field can be provided due to the exploitation of fundamental physical factors such as the ΔE effect to shift the mechanical resonance and a large demagnetization field to minimize the magnetization and operate at larger magnetic fields.

Example embodiments provide a significant advance in magnetoelectric composites for replacing electromagnetism in various practice and research applications.

Embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

Multiferroic-Based Wireless Enemy Transfer

A framework is presented to illustrate an example performance of multiferroic-based wireless energy transfer (WET). In this example framework, multiferroic composites with different geometrical arrangements are operated in both converse and direct magnetoelectric modes. A concentric multiferroic composite ring is used as an example AC magnetic field transducer based on the application of AC electric field to a piezoelectric ring, while a laminated composite is used as a receiver. The latter is situated at the center of the former without any wiring or conductive coupling media, thus constituting a non-contact operation. A DC magnetic field can be simultaneously applied diametrically to the ring and laterally to the laminate.

An analytical model is provided to predict the AC magnetic flux (B) at the center of the concentric multiferroic composite ring based on the assumption that incrementally small arcs of the ring can be represented as straight bar magnets. This assumption is based on experiments showing that a diametric DC magnetic bias permeated circumferentially through a Terfenol-D ring resulting in a circumferential converse magnetoelectric effect (CME) roughly 30 times greater than a radial CME. In other words, the radial CME component was considered to be insignificant in comparison to the circumferential CME to model the magnetic flux at the center of the ring.

The geometry considered herein is shown schematically in FIG. 1. A magnetic flux emanating from a ring structure (ring) 10 is represented in the polar coordinate system as a function of the converse magnetoelectric coefficient $\alpha_{H,13}$, such that $$\alpha_{H,13} = B_H/V_R \tag{1}$$

where, $V_R$ is the applied voltage across the inner and outer radii of the ring 10, and $B_H$ is the magnetic flux in the circumferential direction. On the other hand, the resulting compositional AC magnetic fluxes at the center of the ring 10 are described in the Cartesian coordinate system. Following experimental conditions, discussed below in more detail, the bias magnetic field is applied along the x-direction as shown in FIG. 1. To further simplify the problem, two planes of symmetry are defined to intersect with the origin and the 0 and π/2 locations on the ring, hence splitting the geometry into four equivalent quadrants. Therefore, the magnetic flux (B) at the center of the ring 10 resulting from an incrementally small, straight bar magnet 12 located circumferentially on the ring can be described by Equation (2).

$$= \frac{2\mu_0 \alpha_{H,13} V_R \Delta l}{4\pi A (\Delta l^2 + R^2)^{1.5}} \tag{2}$$

Where, R is the mean radius of the magnetic ring 10, A is the cross-sectional area of the magnetic ring 10, and 2Δl is the length of the bar magnet 12. Additionally, $\mu_0$ is the permittivity of free space, taken to be $88.85 \times 10^{-12}$ m$^{-3}$ kg$^{-1}$s$^4$A$^2$ in subsequent calculations. The direction of magnetic flux represented in Equation (2) is parallel to the direction of the flux emanating from each representative bar magnet. Thus, the X- and Y-components of the incremental magnetic flux at the center of the ring 10 can be explicitly calculated at any angle θ using Equations (3a) and (3b) below, respectively.

$$\Delta B_x = \frac{2\mu_0 \alpha_{H,13}(\theta) V_R \Delta l}{4\pi A (\Delta l^2 + R^2)^{1.5}} \sin\theta \tag{3a}$$

$$\Delta B_y = \frac{2\mu_0 \alpha_{H,13}(\theta) V_R \Delta l}{4\pi A (\Delta l^2 + R^2)^{1.5}} \cos\theta \tag{3b}$$

The only missing variable in Equations (3a) and (3b) is the converse magnetoelectric coefficient, α(θ), as a function of the circumferential location on the ring 10, which can be represented in each quadrant by $\alpha(\theta) = \mathfrak{A}\theta + \mathfrak{B}$ for θ=[0,π/2]. While higher-order functions can be used to describe the distribution of the circumferential magnetoelectric coefficient, experimental results demonstrate that a linear relationship is sufficient since the magnetoelastic strain shows a quasi-linear response when mapped between the same angles on the ring (represented as the grayscale gradient in the top half of the schematic in FIG. 1) (G. Youssef, S. Newacheck, M. Lopez, G. Youssef, S. Newacheck, and M. Lopez, "Mapping magnetoelastic response of terfenol-D ring structure Mapping magnetoelastic response of terfenol-D ring structure," Appl. Phys. Lett., vol. 192408, no. 110, pp. 1-6, 2017). For illustration, the values of the fitting parameters $\mathfrak{A}$ and $\mathfrak{B}$ were calculated from experimental results of the magnetoelectric coefficient and found to be 17 mG V$^{-1}$ and 35 mG V$^{-1}$, when α(θ) is corresponding to a bias magnetic field ($H_{Bias}$) of 500 Oe at an electric field with a frequency of 34 kHz.

In all, the total magnetic flux in the X-direction at the center of the ring 10 from one of the four quadrants can then be described by the integration of Equation (3a) from 0 to π/2, in which the arc length Δl can be rewritten in terms of Δθ. The post-integration relationship is then $$B = \frac{\mu_0}{4A\pi(R^3)}(\mathfrak{A}\frac{\pi}{2} + \mathfrak{B} - \mathfrak{A}). \tag{4}$$

Bichurin and Petrov theoretically modeled the direct magnetoelectric effect (DME) of a laminate layered multiferroic composite for several mechanical boundary conditions, as well as various directions of the polarization of the piezoelectric phase and the applied magnetic field in the magnetostrictive phase (M. I. Bichurin and V. M. Petrov, "Modeling of magnetoelectric interaction in magnetostrictive-piezoelectric composites," Adv. Condens. Matter Phys., vol. 2012, no. c, 2012). For idealized bonding conditions, they predicted the largest DME response when the laminate was oriented such that the magnetic field applied along the length and the electric field measured across the thickness, which resulted in electric displacement perpendicular to the bias and driving magnetic fields. The analytical equation of the transverse DME $\alpha_{E,31}$ was given by $$\alpha_{E,31} = \frac{E_3}{H_1} = \frac{-\kappa\upsilon(1-\upsilon)(q_{m,11}+q_{m,21})d_{p,31}}{\varepsilon_{p,33}(s_{m,11}+s_{m,21})\kappa\upsilon+} \quad (5)$$
$$\varepsilon_{p,33}(s_{p,11}+s_{p,21})(1-\upsilon)-2\kappa d_{p,31}^2(1-\upsilon)$$

where, s, q, d, and E are the compliance, piezomagnetic coefficient, piezoelectric coefficient, and permittivity, respectively, and the subscripts p and m refer to the material properties of the piezoelectric and magnetostrictive materials, respectively. Additionally, κ is the bonding quality factor of the composite and ν is the volume fraction of the magnetostrictive phase, both of which values range from 0 to 1. However, a limitation of this model is the inability to predict the resonance behavior of the laminate composite. Thus, the wirelessly transferred voltage from the multiferroic ring to the multiferroic laminated plates composite can be predicted from Equations (4), (5), and the thickness of the piezoelectric layer.

Example SMM-WET Devices

Two example configurations of composite multiferroic structures for bidirectional strain-mediated multiferroic-WET (SMM-WET) structures are provided in further detail below. These structures were investigated as a transmitter and a receiver to illustrate example features.

For the example structures, a stacked laminate of tri-layer lead zirconate titanate (PZT)/Terfenol-D/PZT plates (laminate plates) was placed at the center of a concentric PZT/Terfenol-D hollow cylinder (composite ring). The first SMM-WET configuration was tested by using the composite ring as the transmitter and the laminated plates as the receiver. In the second configuration, the laminate plates were used as the transmitter while the composite ring was used as the receiver.

Regardless of the example configuration, two resonance peaks were observed corresponding to those of the plates and cylinder. Overall, results established that these structures in any configuration can be used as SMM-WET structures, though when the ring was used as the receiver element, the electrical output was noted to be higher. The predictions of the theoretical framework were found to be in good agreement with the experimental results. The configuration of such devices may be varied by, for instance, changing the geometry or considering other material selections, each of which can improve or optimize the results. Additionally, an electromagnet for the example SMM-WET structure can be substituted with, for instance, a permanent magnet with a strength of the magnetic flux emanating from it equal to the magnetic energy required to optimally operate the device.

Figure 2A:
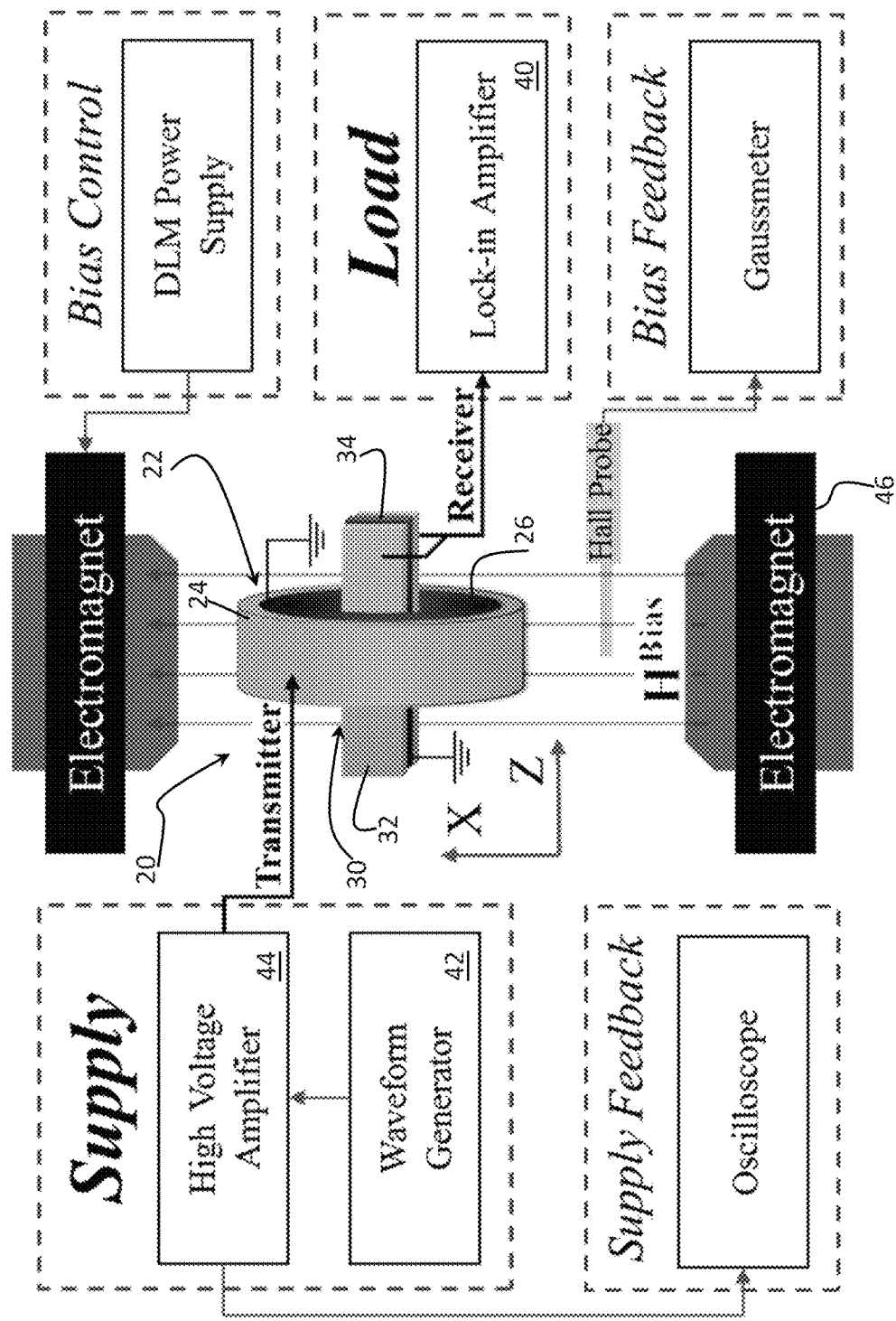
FIG. 2A schematically shows an example configuration including an SMM-WET according to an embodiment, which employs a concentric ring transmitter with a laminate plate receiver. Feedback systems are provided to measure the applied electrical and magnetic boundary conditions.
Figure 2B:
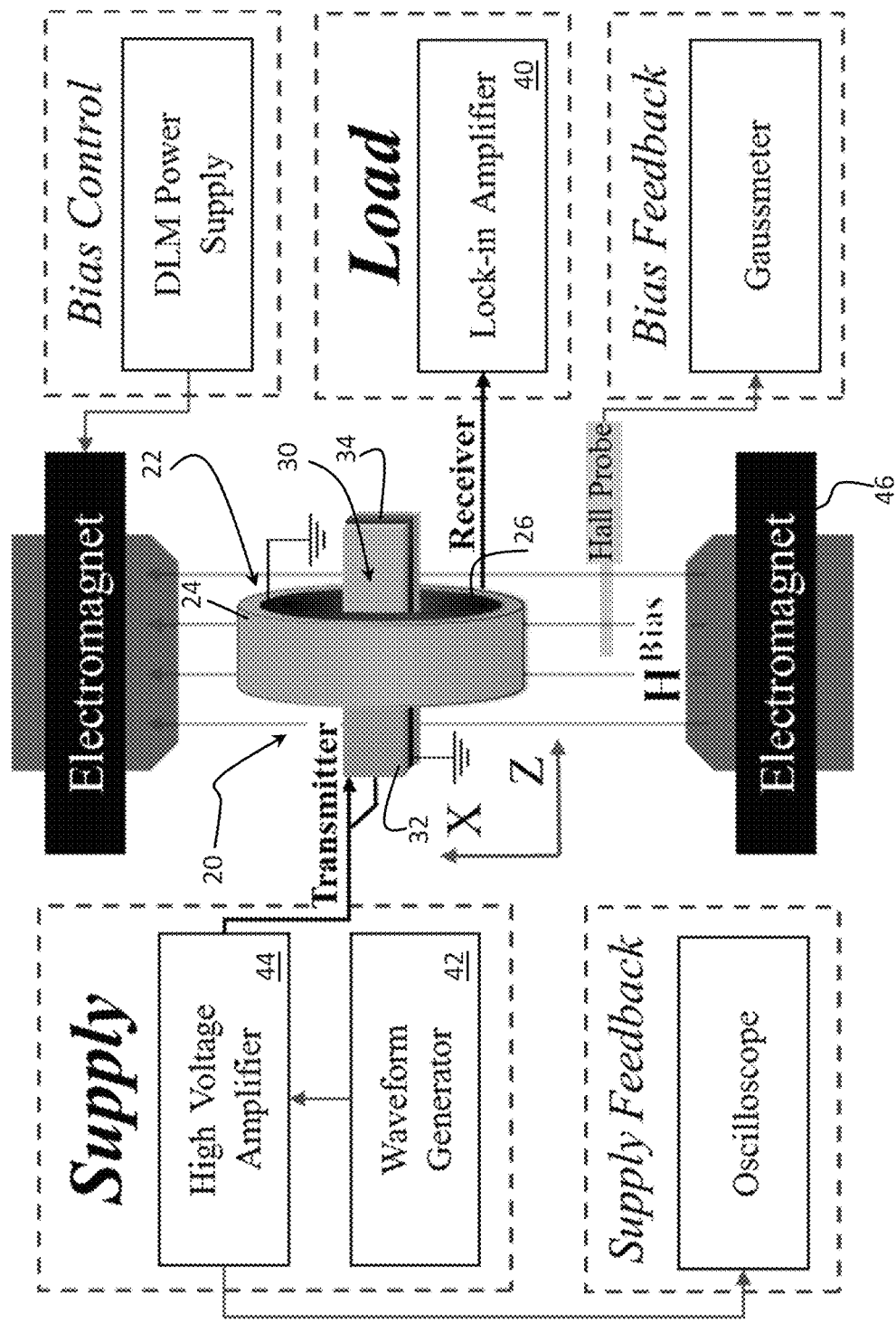
FIG. 2B schematically shows an example configuration including an SMM-WET according to another embodiment, which employs a concentric ring receiver with a laminate plate transmitter.

Referring now to FIGS. 2A-2B, an example multiferroic-based SMM-WET apparatus 20 used in some experiments disclosed herein generally includes first and second elements providing a transmitter and a receiver (or vice versa). An example first element 22, e.g., a composite ring, is constructed of two concentric rings 24, 26, providing two layers (though more than two layers can be provided in example embodiments in various quantities for each layer and various stacking arrangements to provide multilayer (n-layer) structures). The layers 24, 26 of the composite ring 22 were bonded together using a conductive adhesive, which in a particular example is silver epoxy (MG Chemicals 8331).

In the example composite ring 22 the outer ring (layer) 24 is a piezoelectric material, particularly radially polarized PZT (APC PZT-841) with 30 mm outer diameter (OD) and 25 mm inner diameter (ID), while the inner ring (layer) 26 is a magnetostrictive material, e.g., [112] axially aligned Terfenol-D (Etrema) with 25 mm OD and 20 mm ID. The height of both example rings 24, 26 is 5 mm.

The example second element 30 includes a laminated composite (e.g., composite plate, laminated plates, laminate stack) of inward poled 0.5 mm-thick PZT plates (APC) 32 providing piezoelectric layers sandwiching a Terfenol-D plate (Etrema) 34 providing a magnetostrictive material. More than two layers can be provided in example embodiments, in various quantities for each layer and various stacking arrangements, to provide multilayer (n-layer) structures. The overall dimension of an example laminated composite 30 is 5 mm wide, 2 mm thick, and 30 mm long. The plates were bonded together using a 5 μm conductive film (Emerson & Cuming CF3350).

The first element 22 and second element 30 were tested in two different example configurations. In the first configuration, shown in FIG. 2A, the concentric composite ring 22 was used as the transmitter, and the laminated composite plate 30 placed in the center of the composite ring was used as the receiver. In a second configuration, shown in FIG. 2B, while the relative placement between the composite ring 22 and composite plate 30 structures remained the same as the first example configuration, the composite ring structure was used as the receiver while the composite plate was used as the transmitter.

Regardless of the configuration, the composite plates 30 were symmetrically aligned along the centroid axes of the composite ring 22 without physical contact in an example arrangement. These two example configurations demonstrate the ability of the example multiferroic-based WET apparatus 20 to provide bi-directional energy transfer.

Experimental Setup and Operation

Prior to the characterization of the bi-directional energy transfer of the example multiferroic-based SMM-WET device 20, the magnetic flux emanating from the composite ring structure 22 was quantified at the location of the placement of the composite plate 30. In doing so, a search coil wrapped around a dummy sample (i.e., non-magnetic core) was placed at the center of the composite ring 22, where the electromotive force ($V_{emf}$) generated by the magnetic flux from the magnetoelectric ring was measured by a lock-in amplifier 40 (SRS-830) synced with the frequency of the applied electric field.

The composite ring 22 was activated by a sinusoidal electric field applied radially onto the piezoelectric phase 24 with a waveform generator (Agilent) 42 and high voltage amplifier (Trek 780) 44. The frequency of the electric field was swept from 1 to 100 kHz in steps of 1 kHz while the peak-to-peak amplitude remained constant at 100 V. Meanwhile, a uniform bias magnetic field was applied diametrically to the composite ring 22 which was generated by an electromagnet (GMW Associates) 46. The bias magnetic field was swept from 125 to 500 Oe in steps of 125 Oe to activate the piezomagnetic phase of Terfenol-D. The composite ring 22 was mechanically free of mechanics boundary conditions.

The alternating magnetic flux was then calculated from the RMS of $V_{emf}$, the search coil geometry, and the frequency of the applied electrical field. These measurement steps were repeated to measure the magnetic flux in the X, Y, and Z directions by aligning the axis of the coil with a corresponding direction.

The experimental protocol was divided into two steps mirroring the configurations of the example SMM-WET device 20. In the first step (and configuration), the composite ring 22 was used as the alternating magnetic flux generator (i.e., transmitter element) in response to an applied AC electric field on the piezoelectric ring 24. All other electrical, mechanical, and magnetic experimental variables remained the same as stated above. The voltage response from the receiver element provided by the laminated plates 30 was then measured using the lock-in amplifier 40. In essence, the transmitter element 22 was operating in the converse magnetoelectric mode while the receiver 30 was in the direct magnetoelectric mode, where the generation of magnetic flux and electric displacement were due to strain-mediation of the electrical and magnetic energies, respectively.

To assess the example SMM-WET device 20 as a bi-directional energy transfer paradigm, the second experimental step shown in FIG. 2B was focused on testing the laminated plates 30 as the transmitter element while the composite ring structure 22 was used as the receiver element. Using the same measurement and driver conditions as those delineated above, the voltage across the wall thickness of the outer piezoelectric ring 24 was measured while the laminated plates 30 were subjected to the AC electric field.

Results

Figure 3:
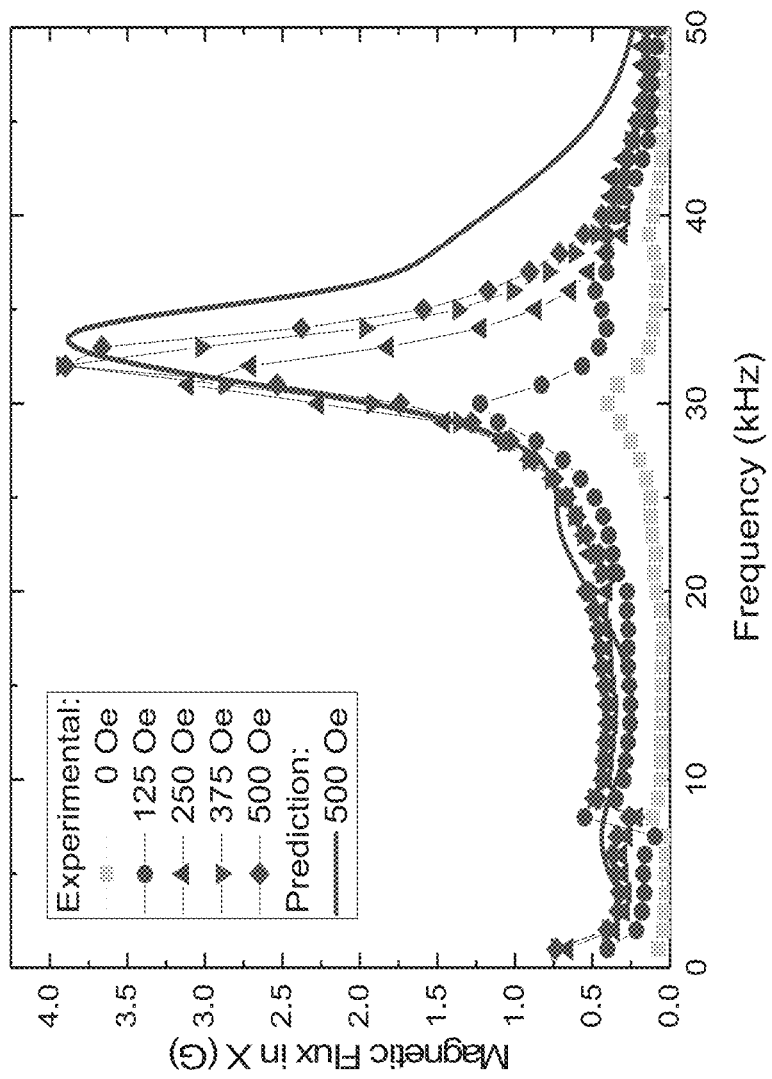
FIG. 3 shows a magnetic flux at the center of a concentric lead zirconate titanate (PZT)/Terfenol-D ring according to an embodiment plotted with a constant bias magnetic field with respect to frequency in the X-direction.
Figure 4:
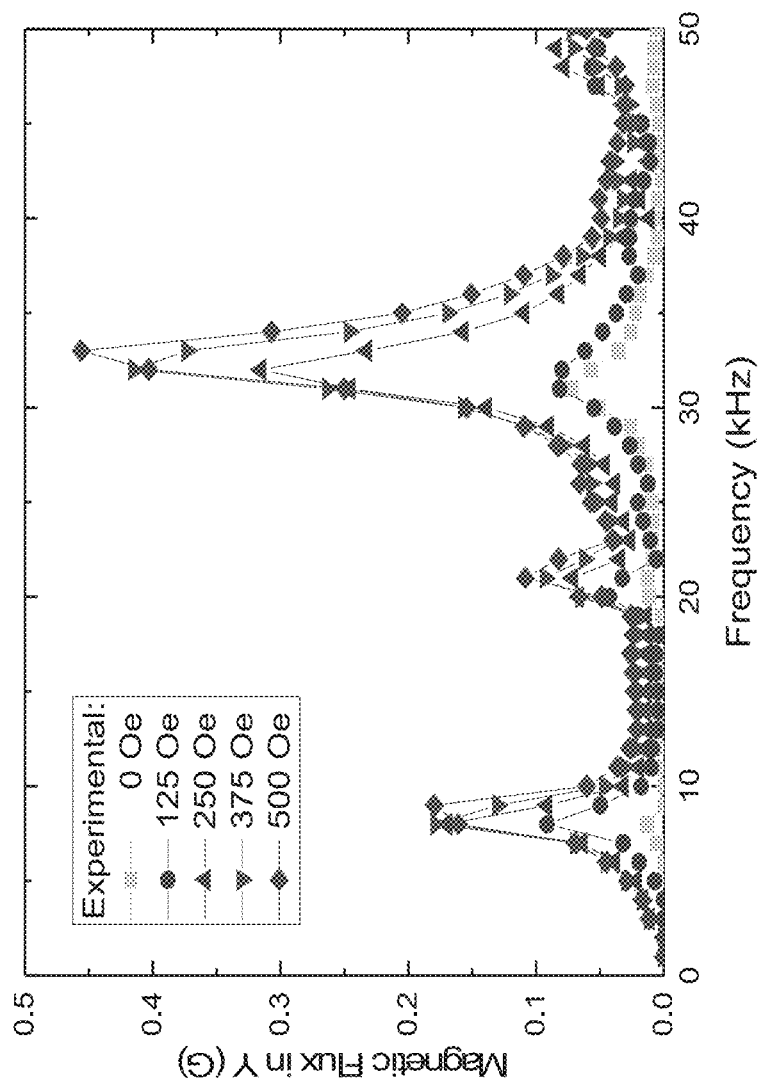
FIG. 4 shows a magnetic flux at the center of the concentric PZT/Terfenol-D ring plotted with a constant bias magnetic field with respect to frequency in the Y-direction.
Figure 5:
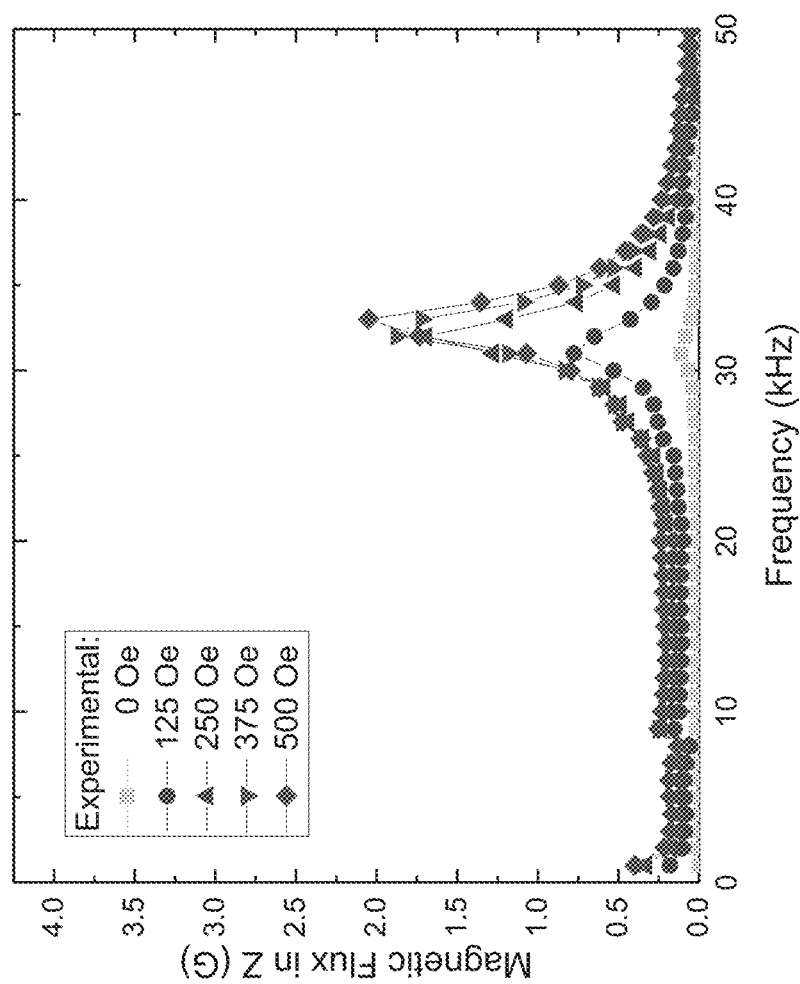
FIG. 5 shows a magnetic flux at the center of the concentric PZT/Terfenol-D ring plotted with a constant bias magnetic field with respect to frequency in the Z-direction.

Results from measuring the magnetic flux at the center of the composite ring 22 using a search coil wrapped around a nonmagnetic core are summarized in FIGS. 3-5, which show the magnetic flux in the X, Y and Z directions as a function of frequency at different levels of bias magnetic field, respectively. Although the frequency of the example voltage was set to 100 $V_{p-p}$ and swept between 1 kHz and 100 kHz, the results shown in FIGS. 3-5 were truncated to highlight the near resonance response within 20-50 kHz frequency range. The magnetic flux outside of these bounds was found to be negligible and unchanged with respect to that reported around the resonance frequency.

Regardless of the direction, the response exhibited two similarities while the magnitude of the peak magnetic flux was found to be 3.92 G, 2.03 G, and 0.38 G corresponding to measurements done along the X, Z and Y directions, respectively. Moreover, the magnitude of the magnetic flux was shown to increase non-monotonically with an increase in the bias magnetic field. For example, while the bias magnetic field was increased from 375 Oe to 500 Oe, the value of the magnetic flux along the X-direction was nearly identical. The first similarity in the response was the shifting peak where the resonant frequency gradually increased from 30 kHz to 34 kHz with respect to an increase in the bias magnetic fields from 125 Oe to 500 Oe. Secondly, the full-width at half maximum (FWHM) of the resonance peak remained unchanged at each level of the magnetic field.

Figure 6:
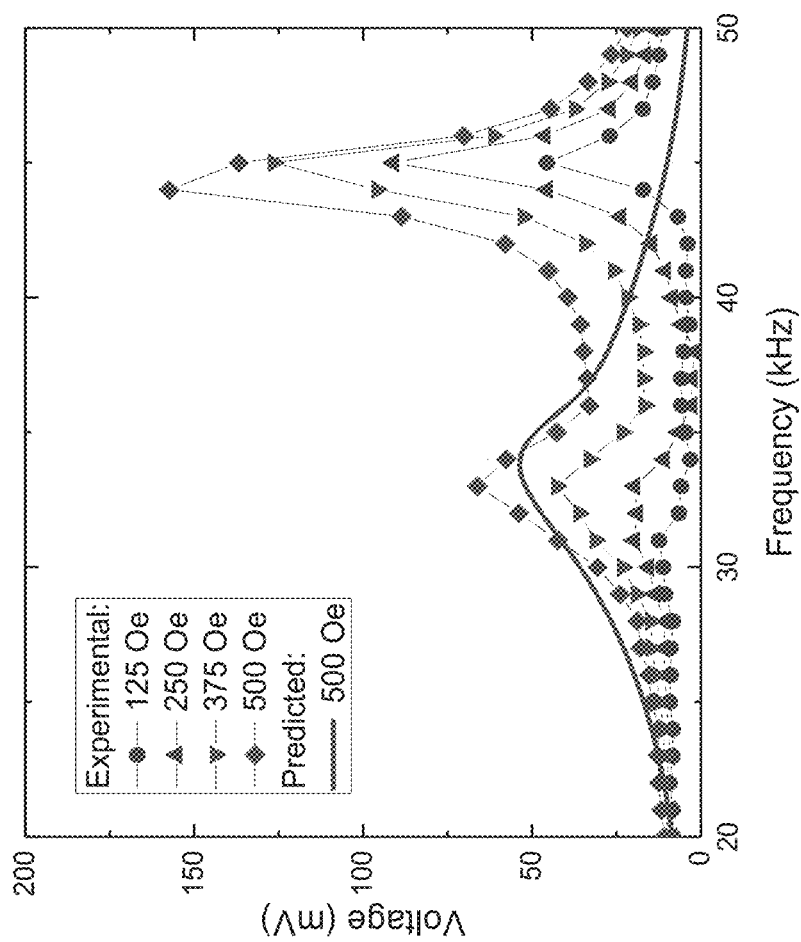
FIG. 6 shows an example (ring transmitter to plate receiver) of a strain-mediated multiferroic composite wireless power transfer root mean square (RMS) voltage response, plotted in terms of bias magnetic field with respect to frequency.

FIG. 6 shows results generated from using the composite ring 22 as the transmitter and the laminated plates 30 as the receiver, or in other words the root mean square (RMS) voltage generated due to the direct magnetoelectric effect. The utility of the data from FIG. 6 can be extended by calculating the produced current using the capacitor governing equation, I=C dV/dt, while taking into account the total capacitance of the receiver (~15 nF) 30 since the PZT plates 32 were connected in parallel. The output power of the transmitter 22 can then be calculated as $P=VI=\omega CV^2$, where $\omega$ is the angular frequency resulting in extracted power of 102 µW at 44 kHz resonance peak and 500 Oe.

A significant difference between the results in FIGS. 3-5 and those reported in FIG. 6 is the appearance of a second resonance peak in the vicinity of 45 kHz in addition to the original peak around 34 kHz. Notably, the amplitude of the voltage corresponding to the resonance peak at ~45 kHz is nearly twice that reported at the 34 kHz peak. When considering the increase in the amplitude of the voltage with respect to the bias magnetic field, it was found that the rate of increase of the voltage was congruent to the rate of bias field increase. Additionally, the second resonance peak was found to shift from 45 kHz at 125 Oe bias magnetic field to 43 kHz at 500 Oe, which is contrary to the behavior shown in FIGS. 3-5.

The prediction of the magnetic flux based on the CME response of the composite multiferroic ring structure using Equation (4) and the output voltage based on the DME coefficient of the tri-layer laminated plate using Equation (5) are shown in FIG. 3 and FIG. 6 as solid-lines, respectively. Generally, the predictive abilities of these equations were found to be in good agreement with the experimental results excluding the 45 kHz resonance peak, which is explained in the discussion section. On one hand, to recreate the plot of the magnetic flux produced by the composite ring 22, discrete a priori circumferential CME measurements were used from previous work, which was then converted to magnetic flux by accounting for the electrical field used during the experiment (e.g., see A. C. Chavez, M. Lopez, and G. Youssef, "Converse magneto-electric coefficient of concentric multiferroic composite ring," J. Appl. Phys., vol. 119, no. 23, 2016; M. Lopez, "The Study of Converse Magnetoelectric Coefficient of a Composite Multiferroic Ring," CSU: Northridge, 2016). On the other hand, the output voltage response was obtained by substituting the material properties of Terfenol-D (e.g., see M. Colussi, F. Berto, K. Mori, and F. Narita, "Strain Energy Density Based Assessment of Cracked Terfenol-D Specimens Under Magnetic Field and Different Loading Rates," Procedia Struct. Integr., vol. 2, pp. 1837-1844, 2016) and PZT-5A (e.g., see T. Wu, C. M. Chang, T. K. Chung, and G. Carman, "Comparison of Effective Direct and Converse Magnetoelectric Effects in Laminate Composites," IEEE Trans. Magn., vol. 45, no. 10, pp. 4333-4336, 2009) in Equation (4) with a quality bonding factor of 0.5, where the results were multiplied by the predicted magnetic flux discussed above that was adjusted for the portion of the plate equivalent to the height of the ring.

Figure 7:
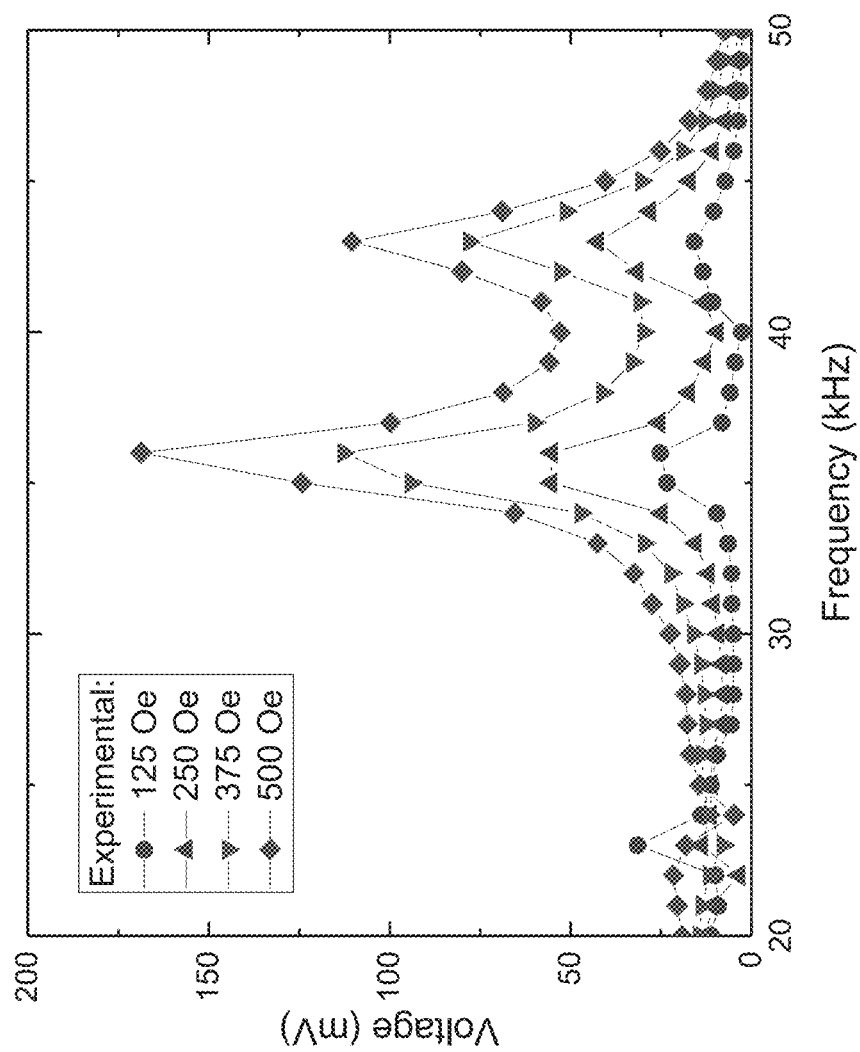
FIG. 7 shows an example (plate transmitter to ring receiver) strain-mediated multiferroic composite wireless power transfer RMS voltage response using a configuration as shown in FIG. 2B, plotted in terms of bias magnetic field with respect to frequency.

FIG. 7 reports results from testing the example SMM-WET device 20 in the second example configuration, where the transmitter is provided by the laminated plate structure 30 and the receiver is provided by the composite ring structure 22. The voltage results reported in FIG. 7 are measured across the wall thickness of the PZT ring 24, which has a capacitance of ~2.01 nF. The data in FIG. 7 is also truncated to the same frequency regime to match FIGS. 5-6. Consistent with the response reported above, the data from testing the second example configuration exhibit two resonance peaks corresponding to 36 kHz and 43 kHz. However, the amplitude of the voltage at 36 kHz is 54% higher than that reported at 43 kHz, opposite to the behavior reported in the first example configuration.

The origins of the example 34 kHz and 45 kHz frequency peaks can be attributed to the density, stiffness, and geometry of the composites. The 34 kHz peak in all three experimental tests (FIGS. 3-7) can be attributed, for instance, to a resonance mode of the composite ring 22. This resonance frequency is consistent with previously disclosed results on the CME of a composite ring (e.g., see S. Newacheck, T. Webster, and G. Youssef, "The effect of multidirectional bias magnetic fields on the converse magnetoelectric response of multiferroic concentric composite ring," Appl. Phys. Lett., vol. 113, no. 17, 2018). On the other hand, the 45 kHz peak can be associated with the laminate composite structure 30 used as the receiver in the above experiment, which can be verified by dividing the output voltage results in FIG. 6 by the magnetic flux data in FIGS. 3-5. Such a normalization scheme can be understood as a measure of the direct magnetoelectric coupling of the receiver as shown in FIG. 8.

Figure 8:
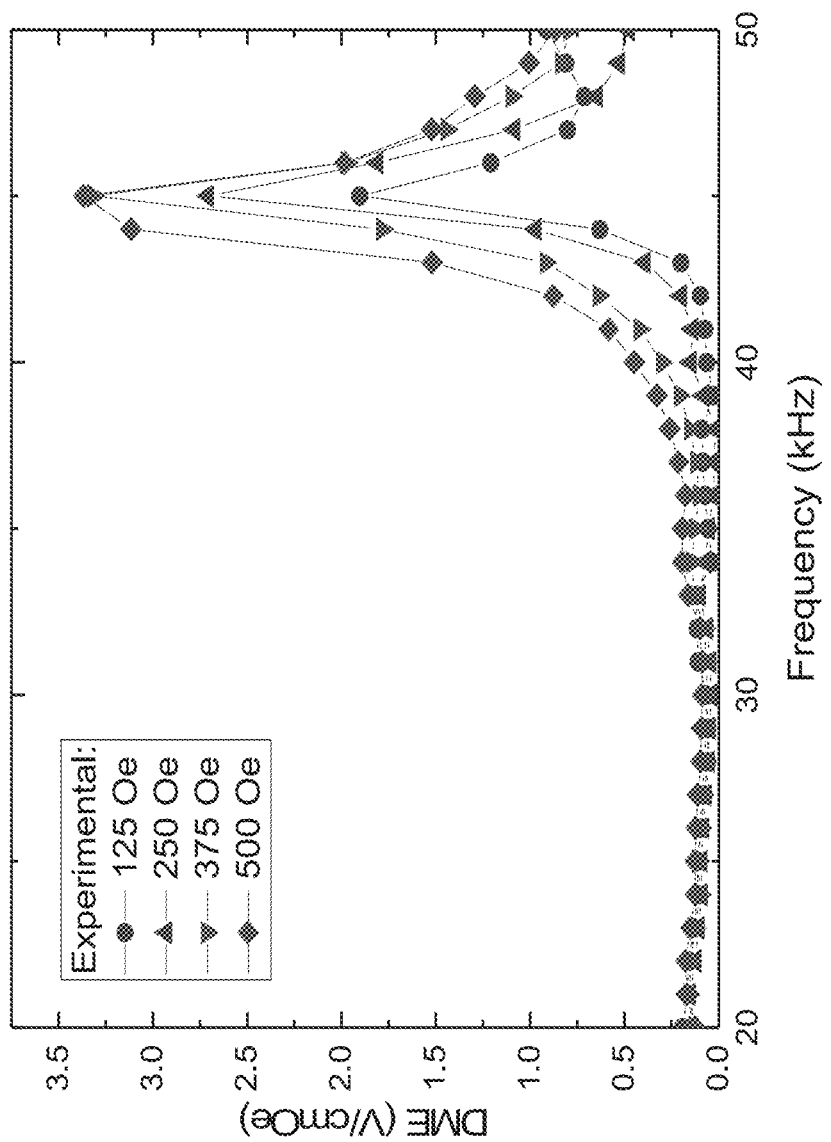
FIG. 8 shows an RMS Direct Magnetoelectric Coefficient of an example PZT/Terfenol-D/PZT laminated plate composite plotted with bias magnetic field with respect to frequency.

The absence of the 34 kHz resonance peak from the DME plotted in FIG. 8 further demonstrates that the 45 kHz peak is solely attributed to the laminated plates 30 used as the receiving element in the example SMM-WET apparatus 20. The presence of two distinct peaks can affect the overall efficiency of a WET device. However, the resonance frequency associated with the receiving element, regardless of the configuration, plays a major role in the overall energy transfer efficiency, as deduced from FIGS. 6-7. Accordingly, example embodiments may be configured to coincide the resonance frequencies of the transmitter and the receiver at a single frequency.

Generally, the resonance frequency associated with the fundamental mode is a function of the mechanical stiffness and the mass of the structure. The shift in the resonant frequencies observed at 34 kHz (FIGS. 3-5) and at 45 kHz (FIG. 6) is due to the change in the stiffness of magnetostrictive materials as a function of magnetic and mechanical boundary conditions. For example, A. Kellogg, Rick; Flatau, "Experimental Investigation of Terfenol-D's Elastic Modulus," J. Intell. Mater. Syst. Struct., vol. 19, no. May, pp. 583-595, 2008, showed that the elastic modulus of Terfenol-D changes as a function of applied stress and bias magnetic field. An increase in the former, within the mechanical limits of the material, results in an increase in the elastic modulus. On the other hand, the elastic modulus was also found to be magnetic field-strength dependent, where at a low magnetic field, below ~750 Oe, the modulus was monotonically decreasing at a rate of 1.5 MPa Oe$^{-1}$, while at a magnetic field above ~750 Oe, the elastic modulus increases at rate of 0.31 MPa Oe$^{-1}$.

While the frequency shifting phenomenon persists around the aforementioned frequencies, a greater degree of shift is present in at 34 kHz than the 45 kHz due to the boundary conditions in an example configuration. That is, the example transmitter (i.e., ring 22) is under mechanical stress from the piezoelectrically-induced strain as well as the change due to the bias magnetic field, or in other words both mechanical and magnetic factors at play. On the other hand, the receiver (plate 30) is just under the influence of the magnetic bias and emanating magnetic field from the ring 22 while being mechanically free.

The resonant magnetic flux output of the composite ring 30 (FIGS. 3-5) continues to increase with respect to the bias magnetic field up to 500 Oe, however, the peaks corresponding to 375 Oe and 500 Oe are not easily distinguishable from one another. The behavior of the magnetic flux as a function of the bias magnetic field is driven by the piezomagnetic coefficients or, in other words, the derivative of the magnetostriction vs magnetic field hysteresis curve. It has been demonstrated that the steepest slope (and therefore the maximum derivative) of the magnetostriction response of the Terfenol-D ring occurs between 375 Oe to 500 Oe.

The coincidence of the above peaks indicates that the magnetostrictive phase of the multiferroic composite structure is operating at the maximum CME-magnetic field response, which is ideal for strain-mediated multiferroic composites. However, the output voltage of the DME response (FIGS. 6-7) of these example composite structures 20 is shown to increase linearly as a function of the bias field, which is attributed to the reduced influence of the magnetic field inside the ring structure 22. Put another way, a further increase in applied bias magnetic field would result in enhancement of the DME response while the CME response becomes insensitive. Therefore, the difference in the behavior of the output magnitudes with respect to the bias magnetic field is due to a dichotomy of bias magnetic fields experienced by the two composite multiferroic structures. In other words, the composite ring 22 is experiencing the effect of the entire applied bias magnetic field, whereas the laminated plates 30 are under the influence of a reduced bias magnetic field. This phenomenon is explained through the effect of magnetic shielding, in which the path of the magnetic field is diverted through the highly permeable ferromagnetic Terfenol-D ring rather than through the low permeability air inclusion within (e.g., see G. Youssef, S. Newacheck, and M. Lopez, "Mapping magnetoelastic response of terfenol-D ring structure," Appl. Phys. Lett., vol. 110, no. 19, 2017). In turn, this reduces the bias magnetic field trespassing the center of the ring 20, which is the reduced portion of the bias magnetic field applied to the laminated plates 30.

Experimental efforts disclosed in G. Youssef, S. Newacheck, M. Lopez, G. Youssef, S. Newacheck, and M. Lopez, "Mapping magnetoelastic response of terfenol-D ring structure Mapping magnetoelastic response of terfenol-D ring structure," Appl. Phys. Lett., vol. 192408, no. 110, pp. 1-6, 2017, have shown that the magnitude of a bias magnetic field is depreciated by roughly 20% when measured at the center of a ring compared to outside. Generally, the state of magnetization in a magnetostrictive material is based on the magnitude of the bias magnetic field due to domain motion. Magnetic domains realign in the direction of the bias field and thus increase the magnetic flux emanating from the material. Cullity and Graham, Introduction to Magnetic Materials, Piscataway, 2009, disclosed different underlying mechanisms associated with domain motion with respect to the applied field. At low magnetic fields, the magnetic domains spontaneously switch directions with minimal incurrence of magnetostriction followed by domain rotations to align with a moderately strong magnetic field. In here and in the case of the laminated plates 30 that are shielded within the composite ring structure 30, the encountered reduced magnetic field is not enough to induce the maximum flux due to rotation of the magnetic domains, hence the persistent increase in the magnitude of the voltage peaks. The depreciated effect of the bias magnetic field is evident regardless of the plates as the transmitter or as the receiver elements in the example SMM-WET 20 since the magnitude of the field is not enough to transition the material into the region of maximum CME or DME responses, respectively.

It will be appreciated that unique features of an example SMM-WET apparatus as provided herein in comparison to induction-based WET are provided by the example SMM-WET apparatus's composite nature, where the peak efficiency can be configured and/or optimized in at least two ways; namely, changing the geometry to tune the frequency, while selecting different constituents for enhanced overall output performance. The experimental transmitter and receiver elements described above had different resonance frequencies, hence the output voltage was not optimized. However, the geometry of these elements can be configured to reach frequency-matching conditions, where the resonance frequencies of both the transmitter and receiver elements coincide. As a result, the output voltage can reach a peak, and the overall efficiency will be higher than in the experimental configuration above.

For example, considering the maximum output magnetic flux emanating from the ring of 4.17 G and the maximum DME of the laminated plates of 16.6 V cm$^{-1}$ G$^{-1}$ and assuming that the frequency-match condition is stratified, the peak-to-peak amplitude of the output voltage is estimated to be 932 mV. Furthermore, using the model shown in Equation (4), the distance from the center (at which the receiver laminated plate element is situated) can be reduced to further enhance the magnetic field encountered by the plate, which will result in improved output as discussed above.

An additional or alternative possible geometrical improvement of example SMM-WET structures includes the adjustment of the volume fraction of the constituents as provided in Equation (5). It has been theoretically hypothesized (without wishing to be bound by theory) that the maximum efficiency occurs when the piezoelectric phase accounts for 60% of the total volume of the laminate composite, whereas the laminate composite used in some example embodiments was 50%.

Further, the efficiency can be improved by optimizing the CME and DME coefficients of the transmitter and receiver, respectively, through the selection of different material phases. For example, it has been disclosed that a multiferroic laminate composite consisting of Metglas and PVDF achieved a peak DME coefficient of 310V cm$^{-1}$ Oe$^{-1}$, which is ~1716% larger than the experimental laminate composites (e.g., see J. Zhai et al., "Giant magnetoelectric effect in Metglas/polyvinylidene-fluoride laminates," Appl. Phys. A, vol. 89, no. 083507, pp. 8-11, 2006). Such substitution with different materials can lead to a significant output voltage of ~15 V. Notably, the above example strategies or their combination can provide improvement methodologies generally analogous to those used for induction-based WET, but with potentially superior efficiencies.

The results delineated above along with the models presented in Equations (4) and (5) (including derivations and suitable variations thereof) can be concurrently used to parametrically design the non-resonance response of example SMM-WET devices. For example, Equation (4) can be used to theoretically predict the magnetic flux at the center as a function of the ring 20 geometry, which in turn will subject the receiver element (e.g., the composite plate 30) to higher magnetic field resulting in higher output voltage.

The above optimization methods are not limited to use in composite ring structures. In general, the CME from any other geometry, not necessarily rings only, can be quantified experimentally, and then a similar approach can be used to derive an equation representing the response at any arbitrary point analogous to the approach shown in the theoretical discussion above.

These example models (including derivations and suitable variations thereof) can also be integrated as objective functions in a formal structural optimization schema to maximize the output while improving the efficiency. Equation (4) and Equation (5) represent example design equations since they collectively include the materials properties of each material phase, the geometry of the transmitting and receiving elements, as well as the applied and resulting fields.

The above results indicate that further optimization of example devices can be achieved by changing the geometry or considering other material selections. In general, a WET device according to example embodiments disclosed herein can provide a significant alternative to the traditional induction-based WET. Further, example geometries can be suitable for microscale or nanoscale miniaturization.

1-3 Strain-Mediated Multiferroic Composite Structure

Additional embodiments herein provide, among other features, a 1-3 (1-3 arrangement) strain-mediated multiferroic composite structure that exhibits an unusual and unexpected increase in magnetoelectric coupling at unprecedented levels of bias magnetic field, above those required for peak magneto-mechanical response and magnetic saturation. This example connectivity scheme allows a novel integration of composite multiferroics in various high magnetic field applications.

Example strain-mediated multiferroic composites, for instance such as those disclosed in Palneedi H, Annapureddy V, Priya S and Ryu J 2016 Status and Perspectives of Multiferroic Magnetoelectric Composite Materials and Applications Actuators 5 9; Nan C W, Bichurin M I, Dong S, Viehland D and Srinivasan G 2008 Multiferroic magnetoelectric composites: Historical perspective, status, and future directions J. Appl. Phys. 103 031101; Mushtaq F, Chen X, Torlakcik H, Steuer C, Hoop M, Siringil E C, Marti X, Limburg G, Stipp P, Nelson B J and Pané S 2019 Magnetoelectrically Driven Catalytic Degradation of Organics Adv. Mater. 31 1901378; Domann J P, Chen C, Carman G P and Candler R N 2018 Multiferroic Micro-Motors With Deterministic Single Input Control 1-24; and Ma J, Hu J, Li Z and Nan C W 2011 Recent progress in multiferroic magnetoelectric composites: From bulk to thin films Adv. Mater. 23 1062-87, and as provided in example structures and methods herein above may be employed in a variety of applications. As nonlimiting examples, magnetoelectric coupling systems and methods may be used in applications such as but not limited to energy harvesters, field sensors, and organic-pollutant degraders by leveraging the DME approach, and in wireless energy transmitters, data storage, and micromotors using the converse coupling (CME) approach.

Overall, voltage-controlled magnetoelectricity can be a viable replacement to electromagnetism, especially at small length scales. A primary appeal of magnetoelectricity is the ability to control the state of magnetization using voltage rather than current as is the case in transitional electromagnetism. Benefits of voltage-controlled magnetism include lower power consumption given the possibility of generating and applying high voltages at substantially diminished current levels, as well as a higher degree of device and feature scalability providing a pathway for nanoscale miniaturization of controlled magnetism (e.g., see Cheng Y, Peng B, Hu Z, Zhou Z and Liu M 2018 Recent development and status of magnetoelectric materials and devices Phys. Lett. A 382 3018-25). Scaled-down devices can be fabricated using a combination of physical and chemical vapor deposition processes to sequentially or concurrently produce layers of piezoelectric and magnetostrictive materials at the micro and nanoscales (e.g., see Lopez-Diaz L, Rothman J, Kläui M and Bland J A C 2001 Vortex formation in magnetic narrow rings: The role of magneto-crystalline anisotropy J. Appl. Phys. 89 7579-81).

However, a large magnetoelectric coefficient may be required for efficient device operation. Such a large coefficient may only be available in a narrow range of operating conditions that are informed by the material selection, the geometry, and the surrounding environmental and boundary conditions.

A large magnetoelectric coupling is usually provided when the composite structure is operated at or near its resonant frequency and under the influence of a bias magnetic field to excite the peak magneto-mechanical coupling of the magnetostrictive material phase. Regarding the former, the geometry plays a major role in defining the resonant frequency, which can be easily calculated as provided herein, and therefore the composite can be engineered for the desired frequency response depending on the scale and kinematical constraints of the device. Regarding the latter, the range of bias magnetic fields to yield a large magneto-electric coupling depends on material selection but is usually between 0 to 500 Oe for the most common magnetostrictive materials. Henceforth, the properties of the magnetostrictive materials play a major role in controlling the response in both cases of direct and converse couplings.

With a specific focus on the range of efficient coupling based on the interaction of the applied bias magnetic field with the magnetostrictive material, the magnetoelectric efficiency is generally maximized at levels of bias magnetic field that corresponds to high magneto-mechanical response. However, the coupling diminishes if the magnetic field is increased to the levels corresponding to magnetic saturation, typically above 1000 Oe (e.g., see Fang F, Xu Y T and Yang W 2012 Magnetoelectric coupling of laminated composites under combined thermal and magnetic loadings J. Appl. Phys. 111). This, in turn, limits strain-mediated magnetoelectric composites from integration in practical applications that may require the presence of large magnetic fields such as magnetic resonance imaging (MRI) instruments, particle accelerators, and particle detectors, among others.

Example embodiments disclosed herein can provide efficient magnetoelectric coupling well within the magnetic saturation region. An engineered strain-mediated magnetoelectric composite is provided according to embodiments, which can achieve peak efficiency at bias magnetic fields well beyond 2000 Oe. Such embodiments include a 1-3 concentric cylinder geometry, with a positive piezoelectric phase surrounding a positive inner magnetostrictive phase. The outer phase can be chosen to be a positive piezoelectric material to impose a clamping force on the inner magnetostrictive material to reduce the magnetism (e.g., see Youssef G, Lopez M and Newacheck S 2017 On the effect of polarization direction on the converse magnetoelectric response of multiferroic composite rings Smart Mater. Struct. 26 037003), while the inner geometry can be chosen for its large demagnetizing effect to further decrease the magnetism and prevent saturation (e.g., see Youssef G, Newacheck S and Lopez M 2017 Mapping magnetoelastic response of terfenol-D ring structure Appl. Phys. Lett. 110 192408). Moreover, a giant magnetostrictive material can be chosen, which has a relatively late onset of magnetic saturation.

Figure 9A:
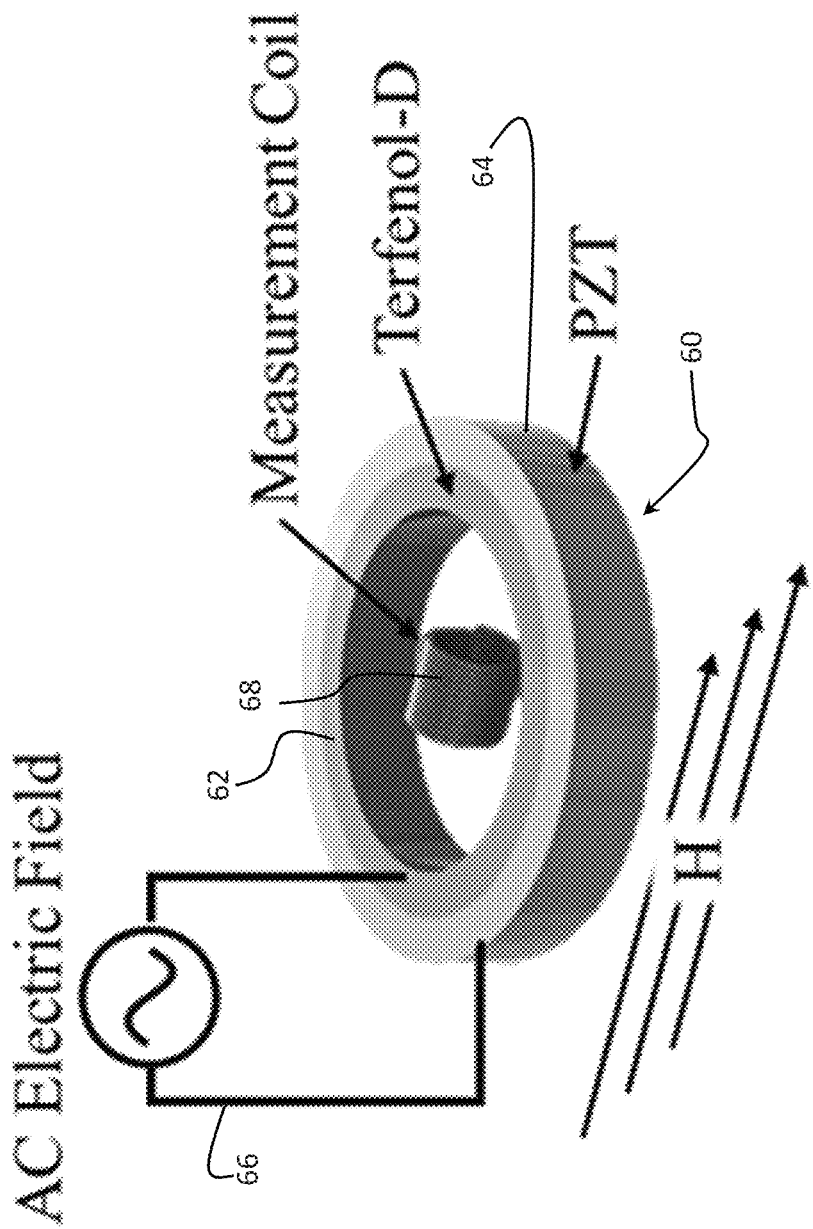
FIG. 9A shows an example 1-3 composite structure according to another embodiment in an experimental setup, including a centrally-located search coil to measure response, and applied boundary conditions.

An example 1-3 composite structure 60 is illustrated in FIG. 9A. The example composite structure 60 has a 1-3 concentric cylinder geometry, and includes a positive magnetorestrictive phase provided by an inner cylinder 62 made from a magnetostrictive material. The inner cylinder 62 is concentrically surrounded by a positive piezoelectric phase provided by an outer cylinder 64 made from a positive piezoelectric material. The inner and outer cylinders 62, 64 are coupled to one another, e.g., using a bonding agent.

The outer cylinder 64 can be radially polarized in lieu of other polarization directions to provide an additional clamping force (e.g., see Youssef G, Lopez M and Newacheck S 2017, On the effect of polarization direction on the converse magnetoelectric response of multiferroic composite rings Smart Mater. Struct. 26 037003). This clamping force (i.e., compressive in nature) can change the magnetic field that may be needed to reach saturation given the positive magnetoelastic anisotropy of the inner cylinder 62 material.

The magnetoelastic response of an example standalone inner cylinder 62 made from Terfenol-D was experimentally investigated and an integrated PZT outer cylinder/Terfenol-D inner cylinder composite 60 was computationally studied within the same magnetic field range and boundary conditions in Youssef G, Newacheck S and Lopez M 2017 Mapping magnetoelastic response of terfenol-D ring structure Appl. Phys. Lett. 110 192408, and Stampfli R, Youssef G and Stamfli R 2020 Multiphysics Computational Analysis of Multiferroic Composite Ring Structures Int. J. Mech. Sci. 177 105573. The cumulative results of the experimental and computational investigations illustrate the ability of the example composite structure 60 to function beyond saturation.

Experimental results elucidating the reduced magnetomechanical response near the poles (located 90° away from the location of the climax of the response) will now be described in more detail, with reference to the nomenclature in Table 1 below.

TABLE 1

| Nomenclature | |
|---|---|
| $C_{ij}$ | Elastic coefficients |
| $\rho$ | Mass density |
| $\varepsilon_{ij}$ | Strain |
| $H_i$ | Magnetic field |
| $B_i$ | Magnetic flux |
| $\chi_i$ | Magnetic susceptibility |
| $q_{ij}$ | Piezomagnetic coefficients |
| $E_i$ | Electric field |
| $e_{ij}$ | Piezolectric coefficients |

The example multiferroic composite structure 60 was configured as shown in FIG. 9A. The example inner cylinder 62 was made from Terfenol-D (Etrema Products), having an outer diameter (OD), inner diameter (ID), and height of 25 mm, 20 mm and 5 mm, respectively. The outer cylinder 64 concentrically surrounding the inner cylinder 62 was configured as a radially poled outer lead zirconate titanate (lead zirconium titanate) (PZT) cylinder (APC International: P/N-841) having an example 30 mm OD, 25 mm ID and 5 mm thickness. The inner and outer cylinders 62, 64 were coupled using a bonding agent provided by a silver conductive epoxy (MG Chemicals: P/N-8330).

The basic physical and mechanical properties for PZT and Terfenol-D are listed in Table 2 below. While the dimensions of the test structure 60 were on the macroscale, a similar configuration can be realized on the micro and nano scales using physical and chemical vapor deposition processes such as magnetron sputtering and atomic layer deposition, respectively. Different piezomagnetic and magnetostrictive materials have been previously deposited on numerous substrates using these deposition techniques (see, e.g., M. Klaui, C. A. F. Vaz, L. Lopez-Diaz, and J. A. C. Bland, "Vortex formation in narrow ferromagnetic rings," J. Phys. Condens. Matter, vol. 15, no. 21, p. R985, 2003; C. L. Jia et al., "Unit-cell scale mapping of ferroelectricity and tetragonality in epitaxial ultrathin ferroelectric films," Nat. Mater., vol. 6, no. 1, pp. 64-69, 2007).

TABLE 2

| Material Properties of PZT and Terfenol-D | | | |
|---|---|---|---|
| Material | Property | Value | Unit |
| PZT-5A | $\rho$ | 7500 | [kg m$^{-3}$] |
| | $C_{11}$ | 99.201 | [GPa] |
| | $C_{13}$ | 50.778 | [GPa] |

TABLE 2-continued

Material Properties of PZT and Terfenol-D

| Material | Property | Value | Unit |
|---|---|---|---|
| | $C_{33}$ | 86.856 | [GPa] |
| | $e_{13}$ | −7.209 | [N C$^{-1}$] |
| | $e_{33}$ | 15.118 | [N C$^{-1}$] |
| | $\varepsilon_{33}$ | 1.5 E-8 | [C$^2$ N$^{-1}$ m$^{-2}$] |
| Terfenol-D | $\rho$ | 9200 | [kg m$^{-3}$] |
| | $C_{11}$ | 8.451 | [GPa] |
| | $C_{13}$ | 3.91 | [GPa] |
| | $C_{33}$ | 28.3 | [GPa] |
| | $q_{13}$ | −5.75 | [N A$^{-1}$ m$^{-1}$] |
| | $q_{33}$ | 270.1 | [N A$^{-1}$ m$^{-1}$] |

The PZT-based outer cylinder 64 was radially polarized (radially poled) in lieu of other polarization directions to provide an additional clamping force (e.g., see Youssef G, Lopez M and Newacheck S 2017 On the effect of polarization direction on the converse magnetoelectric response of multiferroic composite rings Smart Mater. Struct. 26 037003). This clamping force (i.e., compressive in nature) will change the magnetic field that may be needed to reach saturation given the positive magnetoelastic anisotropy of the inner cylinder 62 material (e.g., Terfenol-D).

Once the composite structure 60 was assembled, the resonant frequency ($f_r$) could be calculated by $$f_r = \frac{1}{\pi \overline{D}} \sqrt{\frac{1}{\overline{\rho}\,\overline{s_{11}}}}, \qquad [6]$$

where, $\overline{\rho}$ and $\overline{D}$ are the average density (taken to be 8450 kg m$^{-3}$) and diameter, respectively, and $\overline{s_{11}}$ is the equivalent elastic compliance defined as $$\overline{s_{11}} = \frac{s_{11}^M s_{11}^E}{v_M s_{11}^E + v_E s_{11}^M}, \qquad [7]$$

by the volume fractions of the Magnetostrictive ($v_M$) and piezoElectric ($v_E$) phases (e.g., inner and outer cylinders 62, 64, respectively) as well as the mechanical compliance of the magnetostrictive phase ($s_{11}^M$=1.79E-11 Pa$^{-1}$) and piezoelectric phase ($s_{11}^E$=1.64E-11 Pa$^{-1}$). See, e.g., Colussi M, Berto F, Mori K and Narita F 2016 Strain Energy Density Based Assessment of Cracked Terfenol-D Specimens Under Magnetic Field and Different Loading Rates Procedia Struct. Integr. 2 1837-44; Lee S and Youn B D 2011 A design and experimental verification methodology for an energy harvester skin structure Smart Mater. Struct. 20 057001; Bi K, Wu W, Gu Q L, Cui H N and Wang Y G 2011 Large magnetoelectric effect and resonance frequency controllable characteristics in Ni-lead zirconium titanate-Ni cylindrical layered composites J. Alloys Compd. 509 5163-6.

Figure 9B:
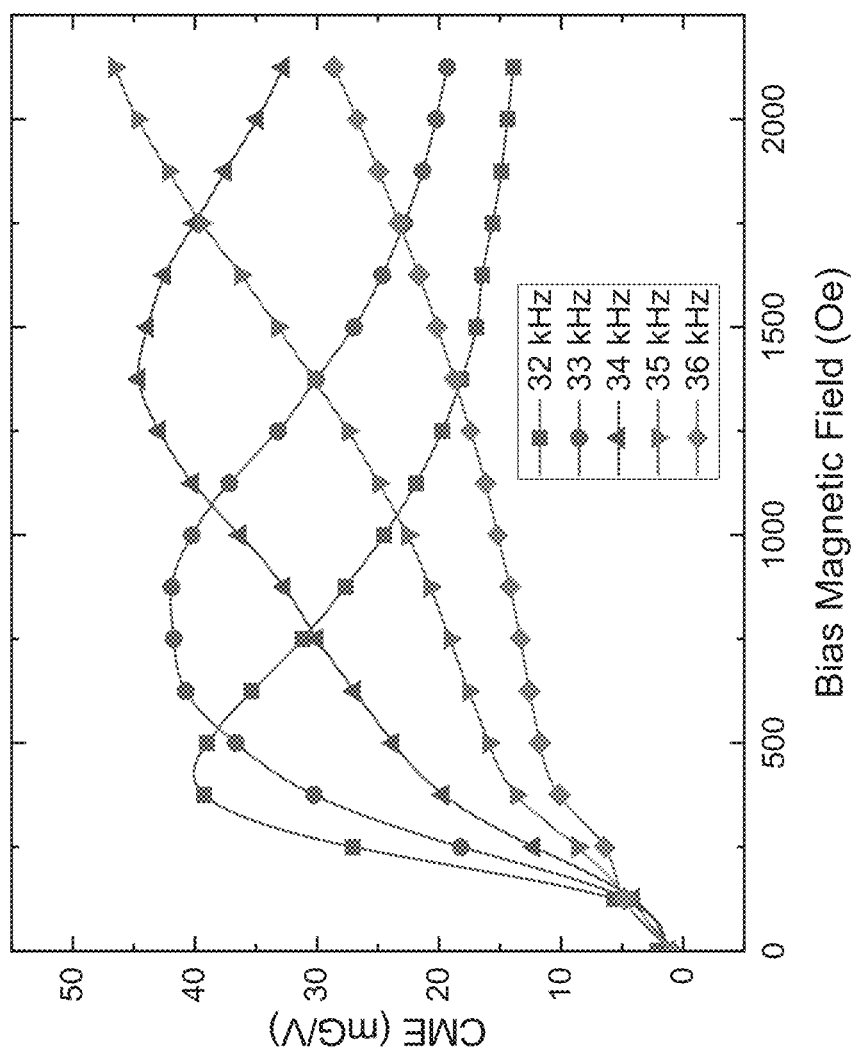
FIG. 9B shows the converse magnetoelectric coupling coefficient (CME) of a concentric composite cylinder structure shown in FIG. 13A, including an outer PZT cylinder and inner Terfenol-D cylinder characterized at different frequencies near its mechanical resonance. The frequency-modulated CME is shown to continue to increase even beyond magnetic saturation of bulk Terfenol-D.

The magnetoelectric coupling coefficient at the center of the fabricated composite sample was characterized in response to actuation of the outer PZT cylinder at 20 kV/m electric field at different frequencies, shown in FIG. 9B, and an increasing bias magnetic field. Particularly, in the experimental composite structure 60, the resonance response was calculated to be 33.5 kHz using Eqn. (6), which served as the center-point of the frequencies experimentally considered (31, 32, 33, 34, 35, and 36 kHz).

Once the frequencies were determined, the composite structure 60 was experimentally investigated while operating under the converse magnetoelectric coupling paradigm, where an AC electric field 66 was radially applied to the piezoelectric cylinder 64 using a function generator (Agilent 33210 A) and a high voltage amplifier (TREK PZD700A). The bias magnetic field was applied diametrically to induce an onion-state magnetic behavior using an electromagnet (GMW 3470) swept from 0 Oe to 2250 Oe (beyond the magnetic field for some commercial MRI systems). The resulting CME was measured using a lock-in amplifier (SRS 830) connected to a search coil 68 positioned at the center of the cylinder aligned with the bias magnetic field. The data was collected using a constructed data acquisition system.

Figure 9C:
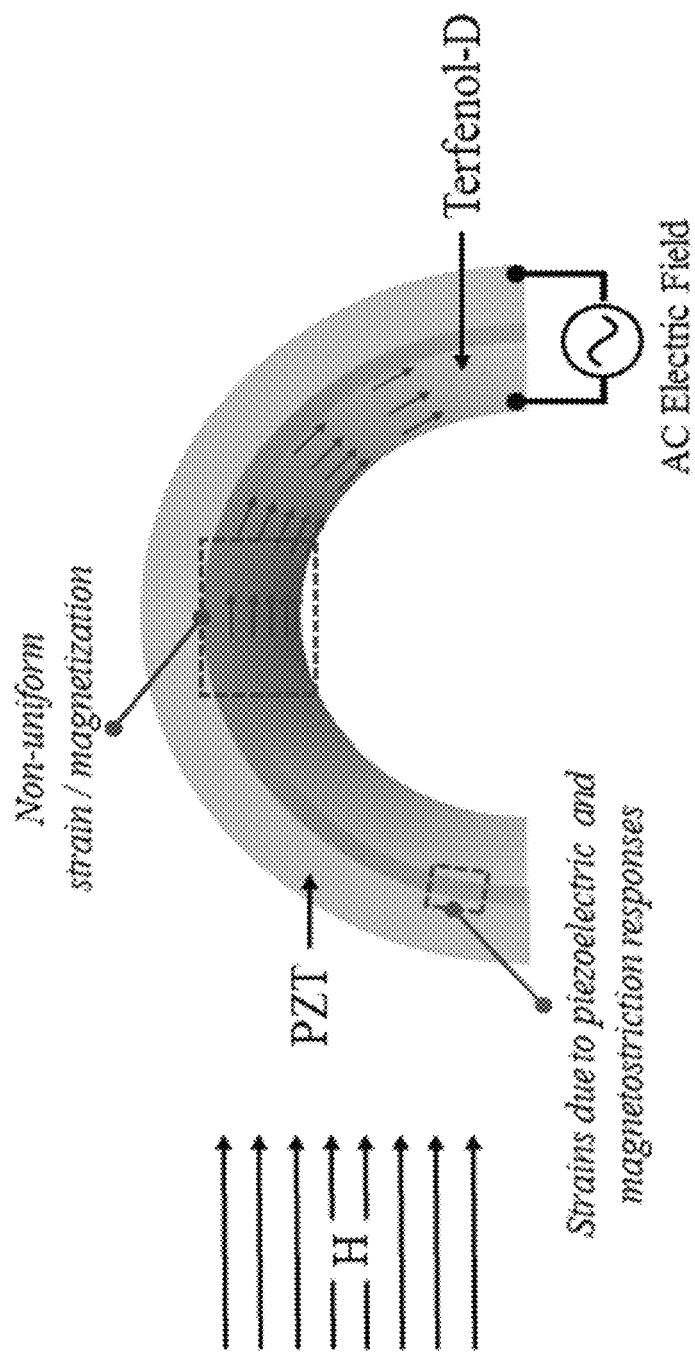
FIG. 9C is a schematic view of combined piezoelectric, magnetostrictive, and shape anisotropy effects for an experimental operation of the concentric composite cylinder structure shown in FIG. 13A.

The CME with respect to the DC bias magnetic field is plotted in FIG. 9B, in which the concentric cylinder composite was actuated with different frequencies of the AC electric field near the calculated resonant frequency. A schematic representation of the complex interaction between the bias magnetic field and the Terfenol-D cylinder 62, as well as the interrelationship between the piezoelectric and magnetostrictive responses, are shown in FIG. 9C. The CME response was found to be experimentally invariant with respect to the amplitude of the electric field applied between 20 kV/m to 80 kV/m (the entire range tested), which is an expected behavior for magnetoelectric composites (e.g., see Palneedi H, Annapureddy V, Priya S and Ryu J 2016 Status and Perspectives of Multiferroic Magnetoelectric Composite Materials and Applications Actuators 5 9). Normally, strain-mediated magnetoelectric composites only have a notable response near resonance and at a bias magnetic field exciting the magnetostrictive phase, which occurs around 375 to 500 Oe for Terfenol-D (e.g., see Park W J, Son D R and Lee Z H 2002 Modeling of magnetostriction in grain aligned terfenol-D and preferred orientation change of terfenol-D dendrites J. Magn. Magn. Mater. 248 223-9). Applying a bias magnetic field above the magneto-mechanical response region tends to decrease the magnetoelectric efficiency until it plateaus at the onset of magnetic saturation (occurring around 1000 Oe for Terfenol-D), similar to what is observed with the 32 kHz response in FIG. 9B.

The example CME was found to continually increase even beyond the magnetic saturation field if frequency modulation is employed. Zhao C P, Fang F and Yang W 2010 A dual-peak phenomenon of magnetoelectric coupling in laminated Terfenol-D/PZT/Terfenol-D composites Smart Mater. Struct. 19 125004, observed a somewhat similar magnetoelectric behavior for a 2-2 PZT/Terfenol-D/PZT stacked laminate composite when tested above the region corresponding to the magneto-mechanical response. However, their response was found to decrease above the magnetic saturation of Terfenol-D at about 1250 Oe. The utilization of the same materials enabled their composite to perform at bias magnetic fields greater than most other magnetoelectric composites. In contrast, the example concentric cylinder geometry in the composite structure 60 allows for performance at an even greater bias magnetic field as demonstrated in FIG. 9C. It is believed that this is the first magnetoelectric composite to not only have a large response above magnetic saturation, but to also be still increasing. Overall, the CME behaviors of the different frequencies can be attributed to numerous physical effects such as the ΔE effect, the mechanical resonance, and the magnetostriction response (e.g., see Park W J, Son D R and Lee Z H 2002 Modeling of magnetostriction in grain aligned terfenol-D and preferred orientation change of terfenol-D dendrites J. Magn. Magn. Mater. 248 223-9; Zhao C P, Fang F and Yang W 2010 A dual-peak phenomenon of magnetoelectric coupling in laminated Terfenol-D/PZT/Terfenol-D composites Smart Mater. Struct. 19 125004; Kellogg R and Flatau A 2008 Experimental Investigation of Terfenol-D's Elastic Modulus J. Intell. Mater. Syst. Struct. 19 583-95).

Figure 10A:
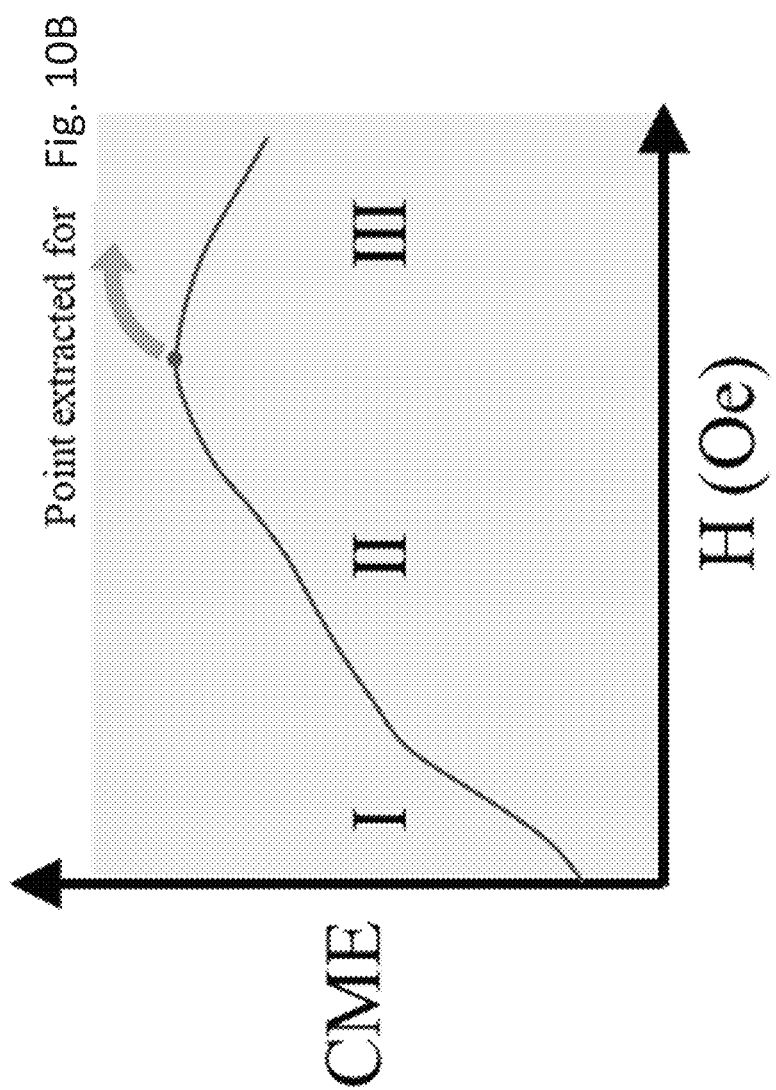
FIG. 10A is a schematic representation of the three-sector CME response as a function of bias magnetic field corresponding to the behavior shown in FIG. 9B.
Figure 10B:
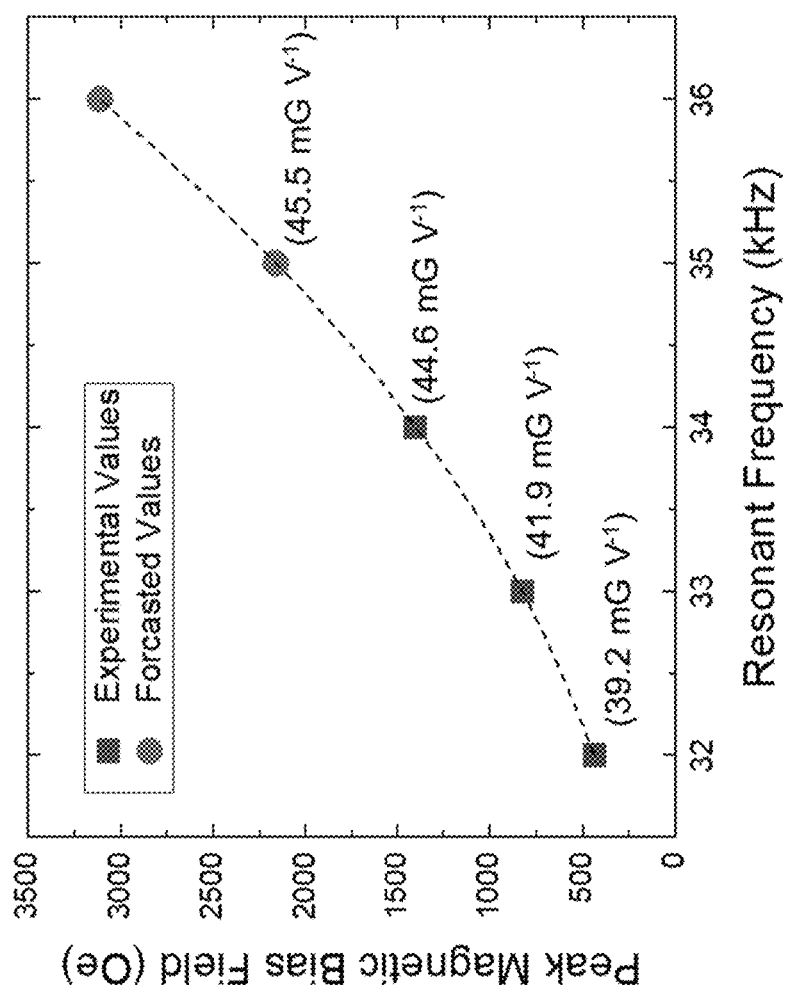
FIG. 10B shows a bias magnetic field as a function of the actuation frequency at which the peak converse magnetoelectric coefficient is reported (values of CME are parenthesized in the figure). The regressed line is used to predict a superior CME response at high bias magnetic field at level nearly triple of the onset of saturation of bulk Terfenol-D.

The peak CME coefficients extracted from the response shown in FIG. 9B are illustrated in FIG. 10B as a function of the bias magnetic field and the frequency of the applied electric field, where the latter was centered around the mechanical resonant frequency of the composite structure as explained above. The mechanical resonance enables a greater strain response, whereas a greater strain-mediated magnetoelectric coupling is measured since the interface quality is assumed to remain nearly unchanged throughout the experiment.

As can be seen in FIG. 9B, the bias magnetic field at which the peak CME response occurs increases with ascending frequency of the applied electric field. Specifically, the peak responses for 32, 33, and 34 kHz occurs at 435, 824, and 1400 Oe (calculated from Gaussian Approximation (e.g., see Sanz J 1996 Image Technology: Advances in Image Processing, Multimedia and Machine Vision (Berlin, Heidelberg: Springer-Verlag))), respectively, plotted in FIG. 10B. The source of the resonance shifting in response to the magnetic field applied behavior is from either a change of compliance, density, or diameter, as portrayed in Eqn. (6). Magnetostrictive materials are known to change in both compliance (i.e., the ΔE effect) and volume (i.e., non-Joulian magnetostriction, which changes the density and diameter) in response to a magnetic field applied. For Terfenol-D, the change in volume effect is typically on the scale of 1%, which has a negligible impact on the resonance shift, whereas the ΔE effect can change the compliance by upwards to 300% being the likely cause of the resonance shift (e.g., see Kellogg R and Flatau A 2008 Experimental Investigation of Terfenol-D's Elastic Modulus J. Intell. Mater. Syst. Struct. 19 583-95; Stamenov P, Jiang C and Coey M 2017 When does magnetostriction not conserve volume IEEE International Magnetics Conference (INTERMAG) p 1).

Moreover, it has been observed that Terfenol-D has a quasi-linear ΔE effect where the stiffness increases with the magnetic field applied, and therefore the resonant frequency should be proportional to the square root of the bias magnetic field as explained in Eqn. (6). Following the trend shown in FIG. 10B, the bias magnetic field for a resonance of 35 and 36 kHz is predicted to occur at values of ~2162 and ~3111 Oe; representing nearly two and three times the field to reach saturation in Terfenol-D, respectively.

Further, FIG. 9B indicates a focus on the region leading to the peak value of the magnetoelectric couple coefficient as the quasi-linear (sectors I and II as illustrated in FIG. 10A), frequency-modulated CME response of the composite cylinder structure 60. This region can be divided into two sectors with respect to the bias magnetic field. This quasilinear behavior was evident at all investigated frequencies, but was more evident at 34, 35, and 36 kHz and, to a lesser extent, at 33 kHz. The first sector ranges from 0 to 375 Oe; thereafter, the second sector commences from 375 Oe until the peak response is reached. The CME rising rates in each of these sectors and frequencies are different. For example, the 36 kHz response increased at an initial rate of 21.3 μG $V^{-1}$ $Oe^{-1}$ then terminated at a slower rate of 14.7 μG $V^{-1}$ $Oe^{-1}$. The inflection point between the two quasi-linear sectors, i.e., at a bias magnetic field of 375 Oe, corresponded to the peak magnetostriction response of Terfenol-D. Once the peak magnetostrictive response of Terfenol-D was reached, the gradual increase in the second sector slowed down the CME response until the ΔE effect stiffens the composite to reach the resonant behavior for the activated frequency.

In essence, this delay of the peak of the CME can be viewed as a way to dynamically tune the resonance response of the structure while being able to operate at higher bias magnetic fields than previously disclosed. For example, if the 36 kHz response followed the same bi-linear behavior to saturation, it is projected that the peak CME will be 43.2 mG/V at 3111 Oe, which is comparable in amplitude to the peak CME at a driving frequency of 33 kHz.

The ability to achieve nearly the same CME around the center of the cylinder at a higher bias magnetic field provides an area of the magnetoelectric coupling making example composites suitable for applications requiring the presence of magnetic fields beyond its saturation limits. The experimental results thus illustrate that example concentric cylinder magnetoelectric composites can exhibit a measurable and tunable response at bias magnetic fields beyond saturation and are capable for use, for instance, in 2 kOe MRI systems (e.g., see Sasaki M, Ehara S, Nakasato T, Tamakawa Y, Kuboya Y, Sugisawa M and Sato T 1990 MR of the shoulder with a 0.2-T permanent-magnetic unit Am. J. Roentgenol. 154 777-8).

Magneto-Mechanical Properties of Ferromagnetic Materials

The linear constitutive relationship of magnetostrictive materials used to solve for strain-mediated magnetoelectric composite systems is given by Equations 8-9.

$$B = \chi H + q\varepsilon \qquad (8)$$

$$\varepsilon = S\sigma + qH \qquad (9)$$

Figure 11:
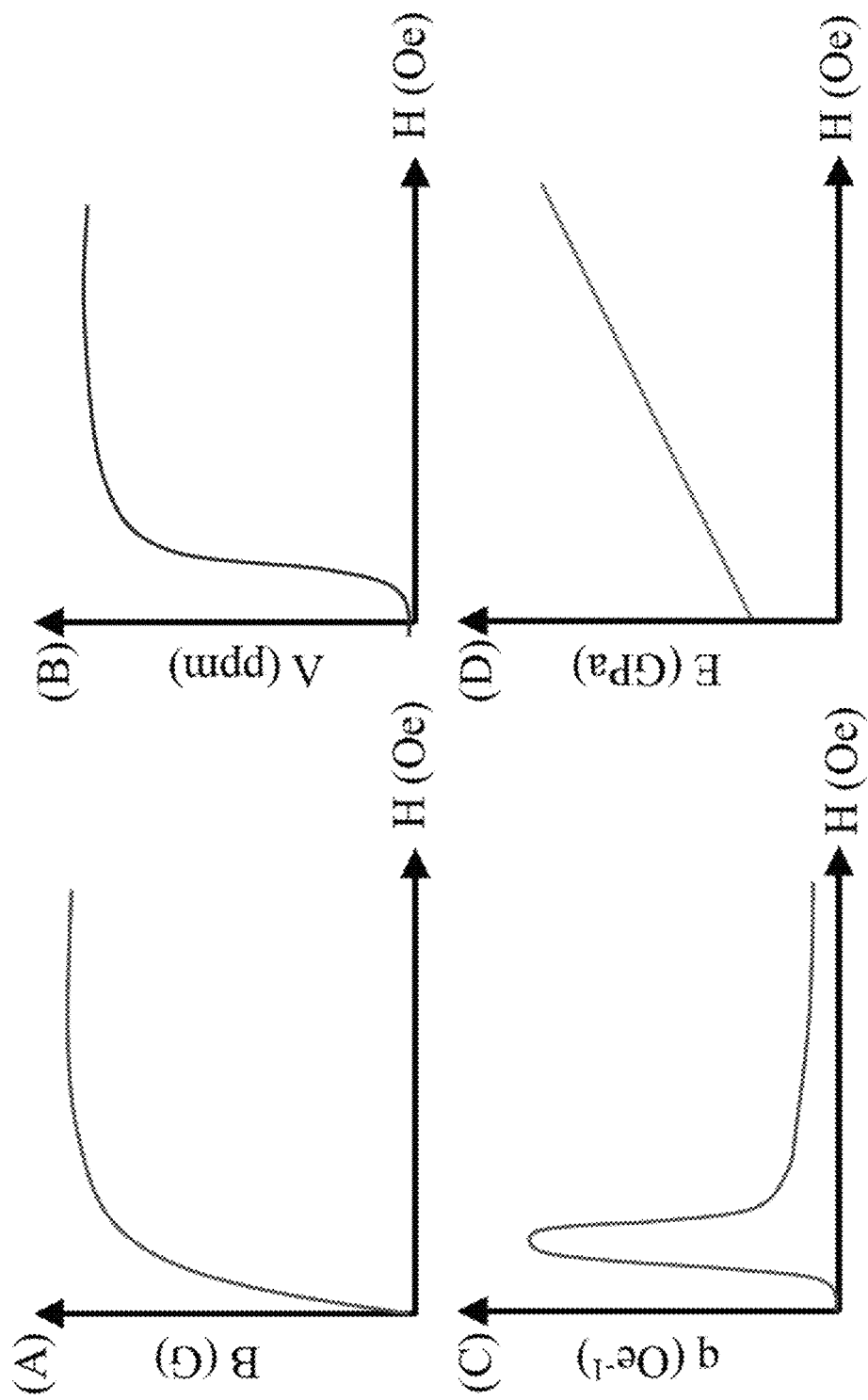
FIG. 11 shows schematic representations of the properties of ferromagnetic materials in response to a magnetic field, A) magnetic flux, B) magnetostriction, C) piezomagnetic, D) Young's Modulus.

Where, S is the mechanical compliance defined as the inverse of the elasticity coefficient matrix. Although the material properties are generally reported as nominal values, as seen in Table 2, these properties are known to be dependent on the bias magnetic field as demonstrated schematically in FIG. 11. FIG. 11(A) shows the B-H relationship (the first term of equation (8)) where the initial slope is the magnetic susceptibility. Conversely, the magnetostrictive strain in response to the magnetic field (the second part of Equation (9)) is shown in FIG. 11(B), where the slope is the piezomagnetic coefficient defining the magneto-mechanical response.

The maximum magnetostrictive strain typically reaches from 800 to 1200 ppm when magnetic saturation is reached, which has been reported to be 1000 Oe for Terfenol-D. Due to the significance of the piezomagnetic response for ME composites, FIG. 11(C) schematically plots the piezomagnetic coefficient as a function of the magnetic field. The piezomagnetic curve in FIG. 11(C) can be thought of as the derivative of the magnetostrictive curve in FIG. 11(B). For reference, the peak piezomagnetic coefficient is referred to as the piezomagnetic region, which is around 375-500 Oe for Terfenol-D.

FIG. 11(D) shows the stiffness (Young's Modulus) with respect to the magnetic field applied, where the change is due to the delta-E effect. The stiffness of Terfenol-D ranges from 18 to 90 GPa depending on the magnetic field applied (e.g., see R. Kellogg and A. Flatau, "Experimental Investigation of Terfenol-D's Elastic Modulus," J. Intell. Mater. Syst. Struct., vol. 19, no. May, pp. 583-595, 2008).

Non-Uniform Magneto-Mechanical Response

The example primary mediator between the electric and magnetic energies in the experimental structure 60 is the mechanical strain. In the case of the converse magnetoelectric coupling paradigm, the application of a bias magnetic field to activate Terfenol-D magnetic response, and the AC electrical field to transduce the strain results in emanation of the magnetic field, which is noted to be non-uniform. Therefore, probing the strain around the circumference gives a visual indication of the nonuniformity of the state of magnetization around the cylinder.

Figure 12A:
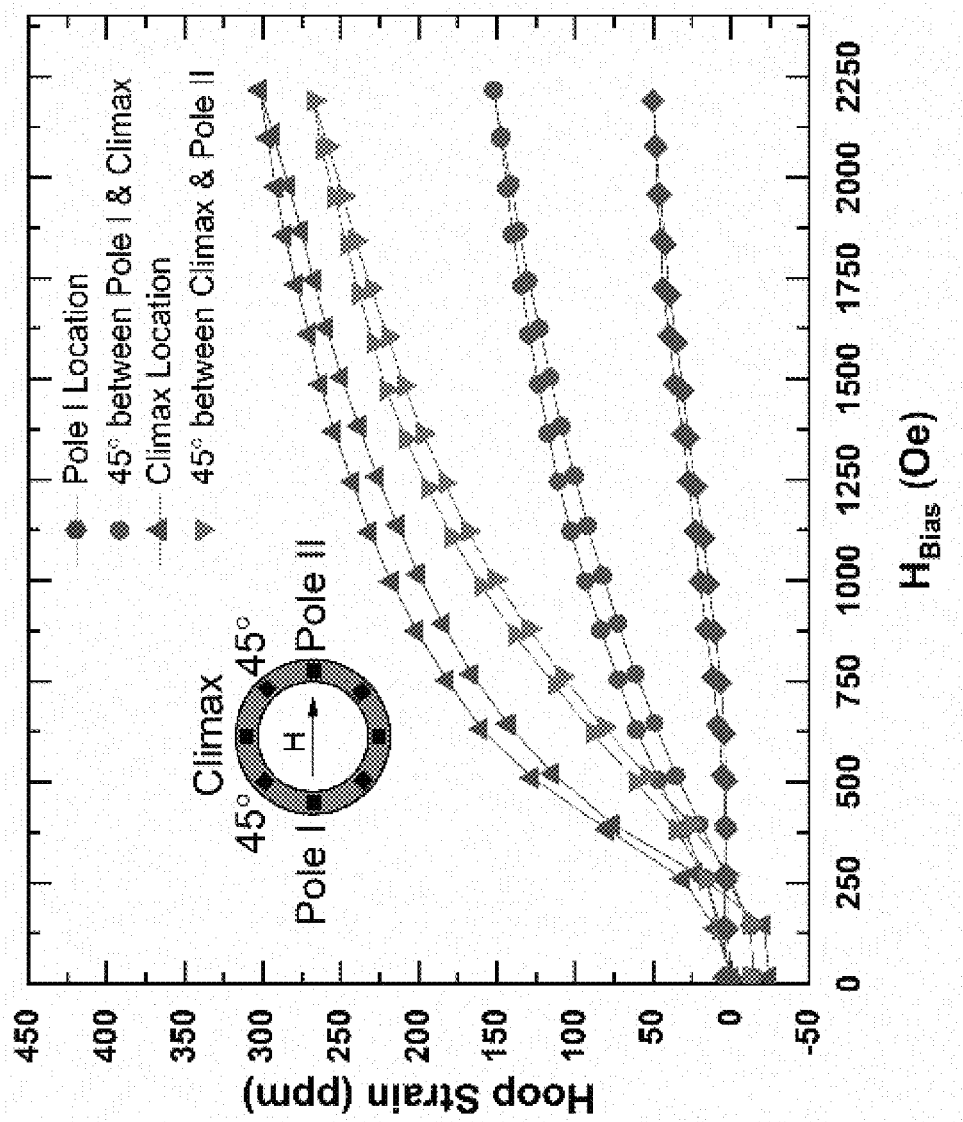
FIG. 12A shows example hoop magnetostrictive strains with respect to a bias magnetic field (reproduced after G. Youssef, S. Newacheck, and M. Lopez, "Mapping magnetoelastic response of terfenol-D ring structure," Appl. Phys. Lett., vol. 110, no. 19, p. 192408, 2017).
Figure 12B:
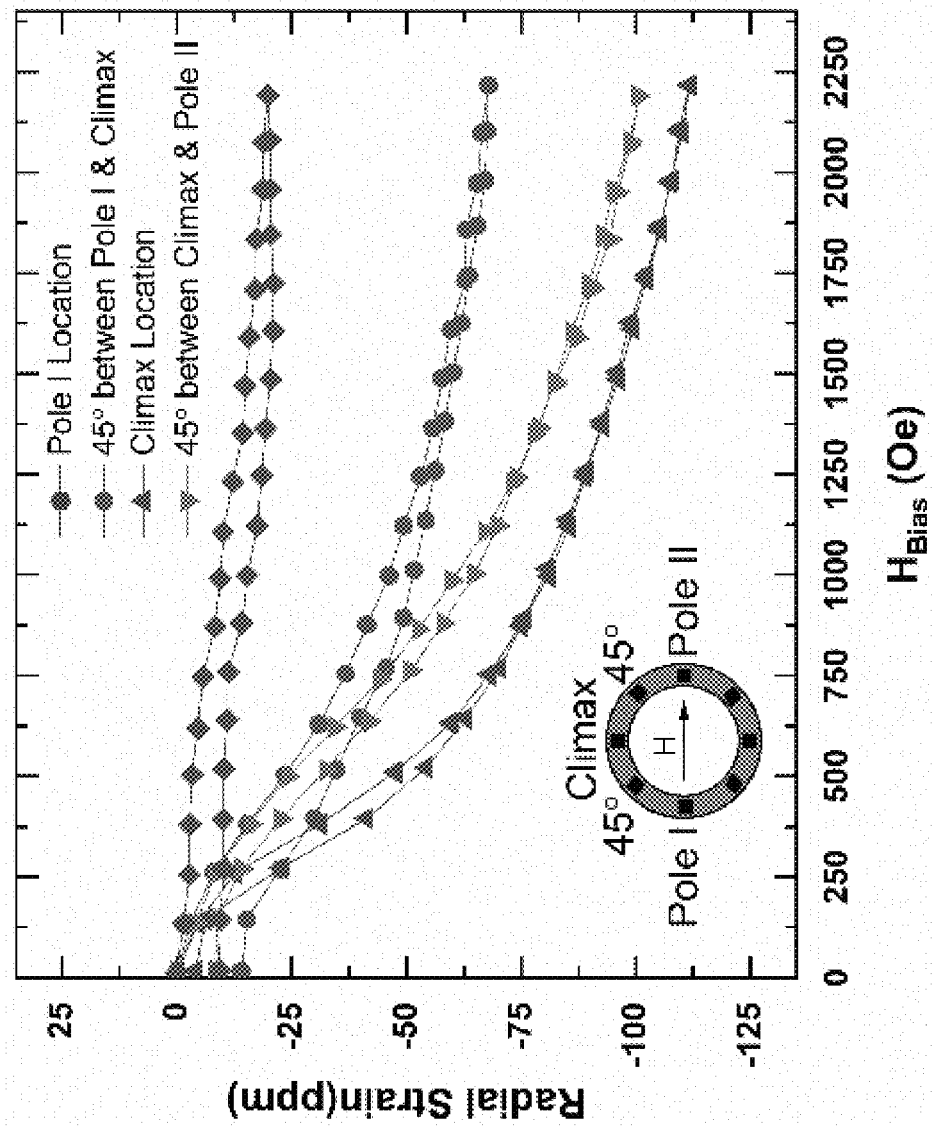
FIG. 12B shows example radial magnetostrictive strains with respect to the bias magnetic field (reproduced after G. Youssef et al., 2017).

G. Youssef, S. Newacheck, and M. Lopez, "Mapping magnetoelastic response of terfenol-D ring structure," Appl. Phys. Lett., vol. 110, no. 19, p. 192408, 2017, disclosed attaching strain gauges to a lone Terfenol-D cylinder with identical dimensions to a component used for a composite structure. The strain gauges were placed to measure the radial and circumferential magnetostrictive response at various locations around the Terfenol-D cylinder as a function of the bias magnetic field. The results of radial and circumferential strain are plotted in FIGS. 12A and 12B, respectively, whereas the locations of the measurements are in the inset of each subfigure. The magnetostriction at the zenith locations (90° and 270°) are quickly reaching the magnetic saturation resembling behaviors similar to the schematic illustration in FIG. 11(B). These locations were the earlier contributors to the overall CME observed at the center of the composite cylinder, referred to as the climax of the response therein. However, the magnetization at the poles (0° and 180°) showed little to no magnetization even beyond the saturation field of 2000 Oe. Additionally, the locations between the poles and zenith (45°) only exhibit a moderate magnetization. Without wishing to be bound by theory, FIGS. 12A-12B supports principles for example cylindrical structures 60 in multiferroic composites providing magnetoelectricity beyond saturation.

Experimental Evidence of the Cylindrical Structure to CME Beyond Saturation

Figure 13A:
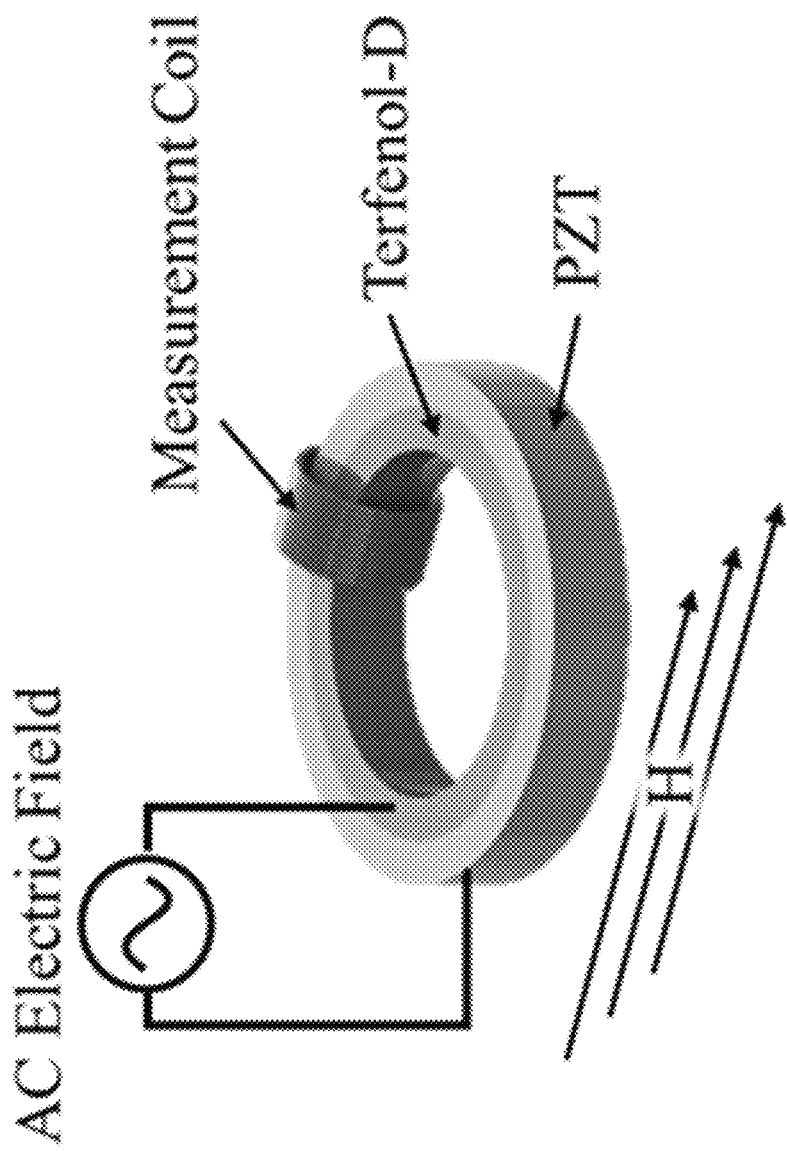
FIG. 13A shows an experimental schematic of an on-ring CME setup.
Figure 13B:
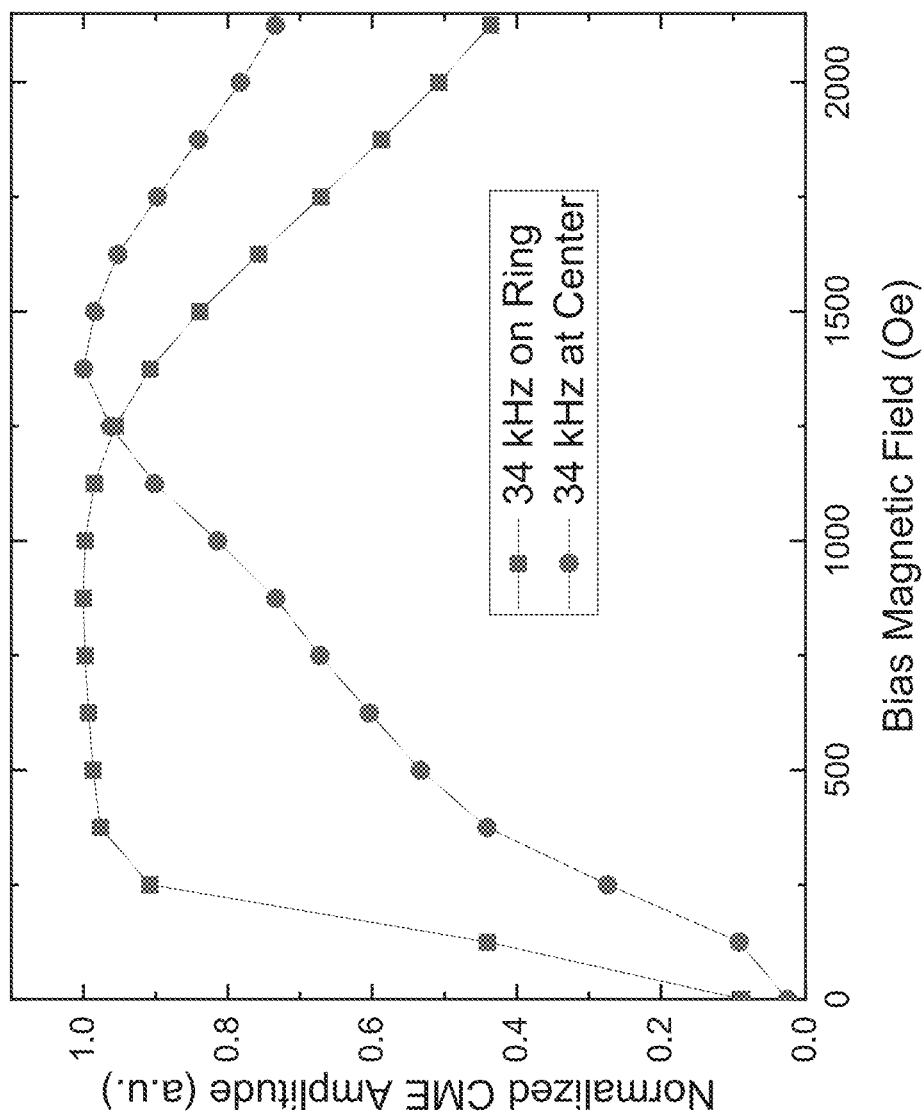
FIG. 13B shows CME as a function of the bias magnetic field.

Without wishing to be bound by theory, it is believed that the resulting magnetoelectric response at higher magnetic fields in example composite structures is based on the delayed magnetic saturation of different regions around the circumference of the cylinder. Contrasting the CME response measured locally on the cylinder with the CME measured remotely at the center can provide experimental evidence supporting this principle. FIG. 13A shows a schematic of an experimental setup used to measure the localized CME on the cylinder, which was identical to the one used to generate the data reported elsewhere herein. FIG. 13B shows the localized and remote CME response at 34 kHz in response to an extended range of bias magnetic fields (e.g., see G. Youssef, M. Lopez, and S. Newacheck, "On the effect of polarization direction on the converse magnetoelectric response of multiferroic composite rings," Smart Mater. Struct., vol. 26, no. 3, p. 037003, 2017).

The experimental results show that the localized CME reaches the maximum at a low magnetic field due to the saturation of the Terfenol-D under the search coil, where further increase in the magnetic field had no effect on the response. However, the CME measured using the centrally-located search coil continues to climb to reach a maxim at higher magnetic field due to the participation of adjacent regions on the cylinder as the magnetic field is increased. That is, as additional regions on the cylinder reach magnetic saturation and emanate field that is sensible at the center, the CME value increases signifying the magnetoelectricity beyond saturation.

Finite Element Simulation

Figure 14A:
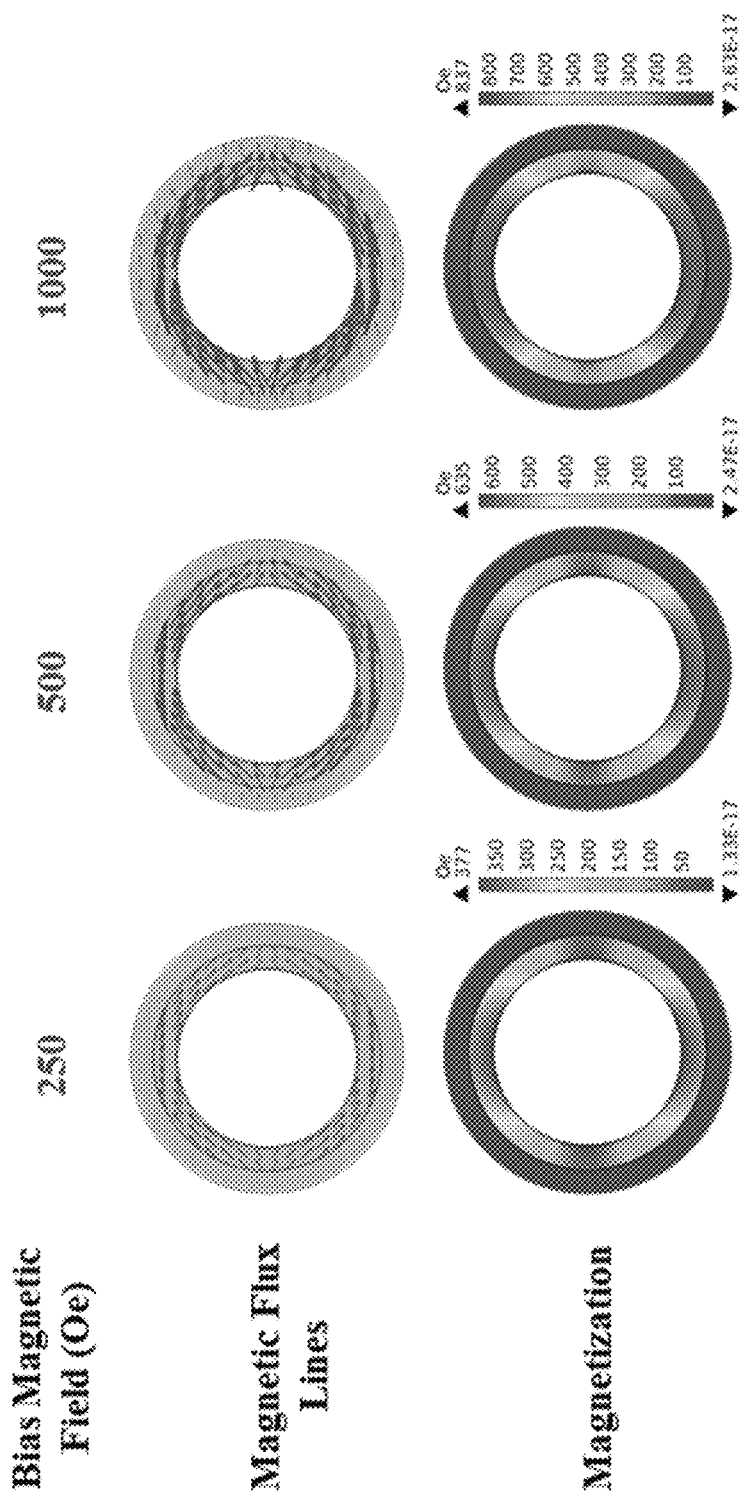
FIGS. 14A-14B show finite element simulation results demonstrating distribution of the magnetic flux lines and magnetization of the composite cylinder in response to different bias magnetic field intensities. The areas reaching magnetic saturation are shown to increase as a function of bias magnetic field, given rise to higher contribution to the CME response. Simulated interrelation between magnetization and magnetic field applied are extracted from points on the inner diameter of the Terfenol-D cylinder starting from the pole to the zenith in 5° increments. The magnetization within 30° of the poles is still unsaturated at 2000 Oe.
Figure 14B:
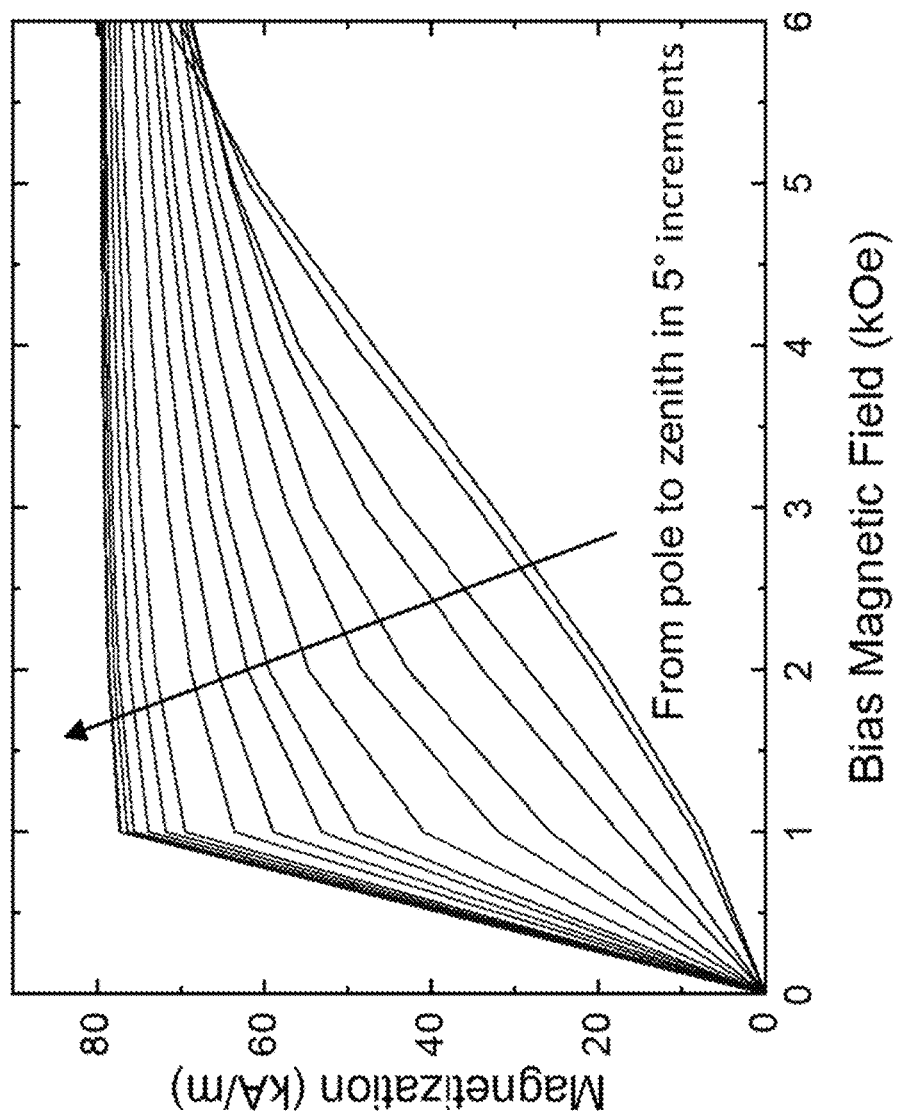

Through the accumulation of the data reported in Youssef G, Newacheck S and Lopez M 2017 Mapping magnetoelastic response of terfenol-D ring structure Appl. Phys. Lett. 110 192408 and Stampfli R, Youssef G and Stamfli R 2020 Multiphysics Computational Analysis of Multiferroic Composite Ring Structures Int. J. Mech. Sci. 177 105573, the DC magnetic flux permeating through the example composite 60 is demonstrated in FIGS. 14A-14B based on a finite element simulation. FIG. 14A shows the vector field of the magnetic flux, and contour plots the magnetization with respect to the bias field applied throughout the cylinder. FIG. 14B shows the magnetization-magnetic field interdependence extracted from the FEA results at points along the inner diameter of the Terfenol-D cylinder located from the pole to zenith in 5° increments.

The high permeability of Terfenol-D, relative to the adjacent air or PZT materials, attracts the DC magnetic flux to travel through the hollow magnetostrictive cylinder forming an onion-state of magnetization. Although a magnetic field of 2000 Oe is well above that required to saturate the magnetization of bulk Terfenol-D, regions near the magnetic poles of the cylinder (within 30°) would not have reached magnetoelastic saturation due to the large demagnetization of hollow cylinders, as explained by Cullity and Graham, 2009 Introduction to Magnetic Materials (Piscataway). In other words, roughly a third of the Terfenol-D cylinder is unsaturated within a 2000 Oe magnetic field. This provides the ability to, among other benefits, exploit 1-3 multiferroic composites for magnetoelectric coupling at high levels of magnetic fields.

Furthermore, the zenith location on the cylinder, at which the climax response has been disclosed (see Lopez M, Youssf G and Youssef G 2016 Converse Magneto-electric Coefficient of Composite Multiferroic Rings J. Appl. Phys. 119 2-7), has been shown to exhibit a similar saturation behavior to other composite structures with different geometrical configurations. The CME measured at the center of the cylinder in example experiments did not exhibit any characteristics of reaching saturation, signifying the contribution of the unsaturated regions on the cylinder, proximal to the poles and away from the zenith, to the nearly-constant peak response measured beyond saturation.

Moreover, and while the regions near the zenith have reached magnetostriction saturation, the presence of a strong demagnetization in the cylinder geometry allows for an even greater amount of magnetic energy to be introduced before complete saturation of the entire structure is attained. This approach to saturation can be seen in FIG. 14A, where the color gradation of the contour plots of the magnetization gradually decreases as the bias magnetic field continues to increase. Therefore, a magnetic field above the bulk-saturation can be applied to the composite structure while the magnetostriction behavior continues to take place in some regions of the cylinder, i.e., somewhere between the magnetic poles and zenith. It is then until the radial state of magnetization at the poles matches the circumferential magnetization at the zenith points, the entire composite structure has not reached complete saturation, although some regions may have as shown in FIG. 14B. Since the CME is observed at the center of the composite cylinder, each portion of the structure can contribute equally to the value of the coupling coefficient given the axisymmetric geometry. At low levels of bias magnetic field, the circumferential magnetization at the zenith points has the largest influence on the measured CME, while on the other hand, the radial magnetization at the poles has the greatest contributions as the bias magnetic field increase beyond the saturation of the areas that have been fully magnetized. As shown computationally in FIG. 14, the radial magnetization at the poles is still far from reaching saturation, which indicates that the composite can still operate at even larger magnetic fields than what is investigated herein. Overall, the concentric cylinder composite can potentially achieve peak magnetoelectric behavior at magnetic fields needed for applications such as magnetic-based medical instrumentations (e.g., MRI) and particle analyzers.

Figure 15:
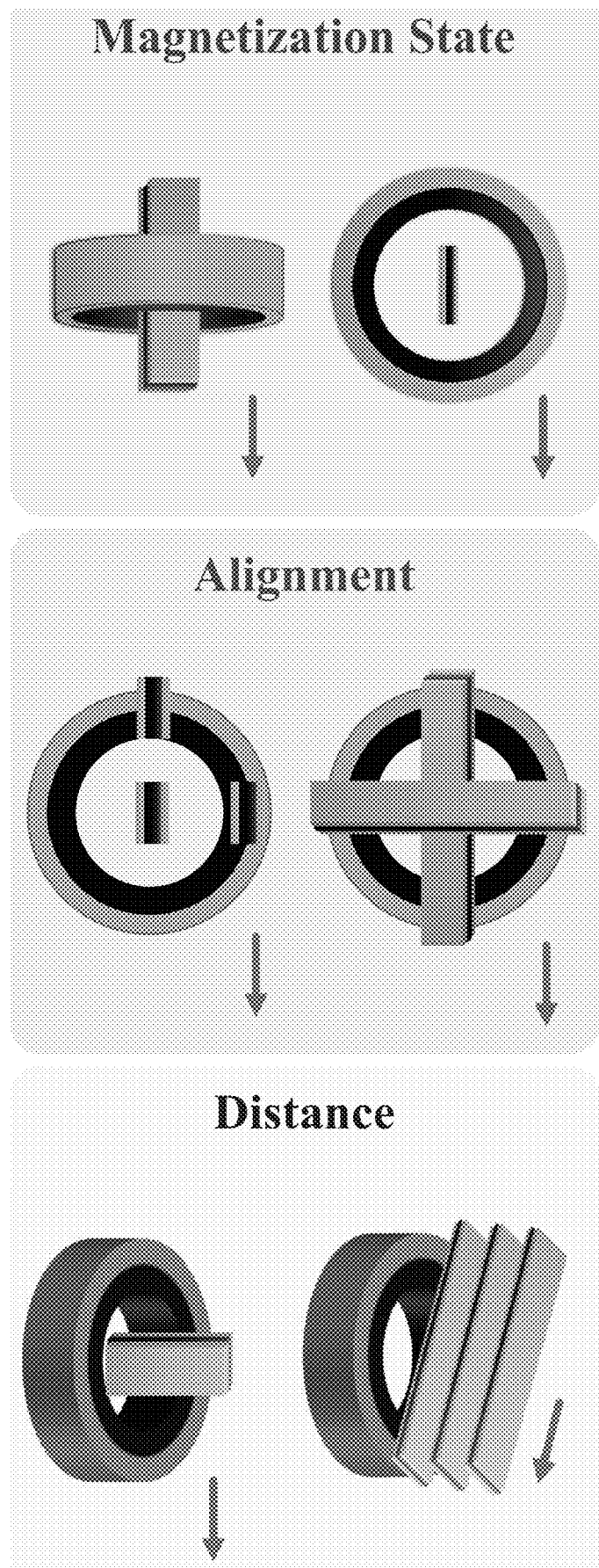
FIG. 15 shows effect of the magnetization state, alignment and distance on performance of an example multiferroic composite structure.

FIG. 15 shows an example parametric characterization, illustrating the effect of magnetization state, alignment and distance on the performance of an example multiferroic composite structure. The outer ring is dimensioned to match the resonance peak of the laminate plate. The left frame shows magnetization state defined based on the relationship between the axis of the device and the applied magnetic field (arrows). The center frame shows that alignment is based on the orientation of the receiver and transmitter with respect to one another. The right frame shows adjustment of distance between the transmitting and receiving elements.

Figure 16:
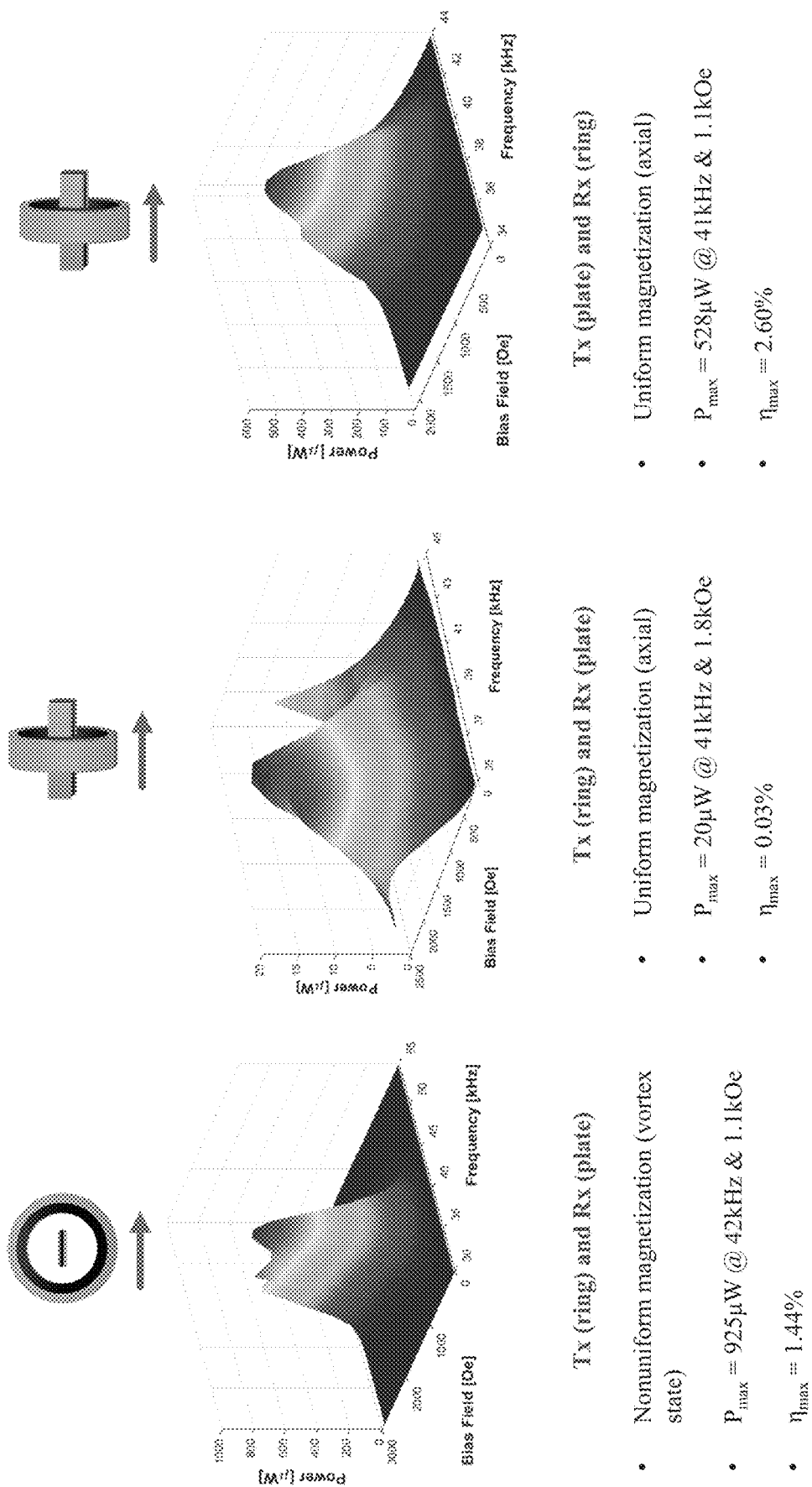
FIG. 16 shows effects of magnetization state for various configurations: nonuniform magnetization (vortex state) (left); uniform magnetization (axial) (center); and uniform magnetization (axial) (right).

FIG. 16 shows effect of magnetization state for various configurations: nonuniform magnetization (vortex state) (left); uniform magnetization (axial) (center); and uniform magnetization (axial) (right). The example ring structure has 25 mm OD, 20 mm, 15 mm ID, while the laminate plate has 30 mm, 10 mm, 2.5 mm. The nonuniform configuration resulted in the highest transferred power but at moderate efficiency. The uniform magnetization (axial) configuration resulted in the moderate transferred power but at highest efficiency.

Figure 17:
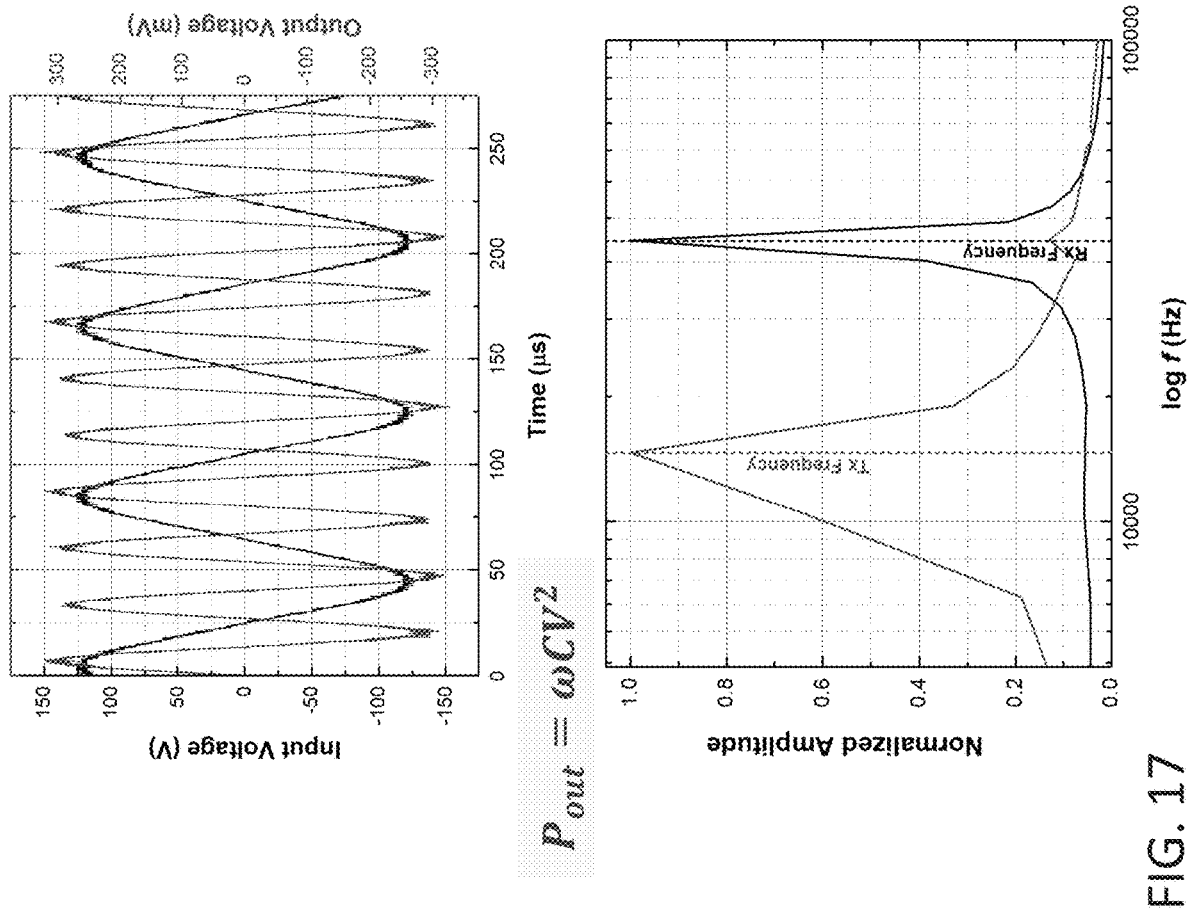
FIG. 17 shows frequency differences between example transmitter and receiver elements.
Figure 17:
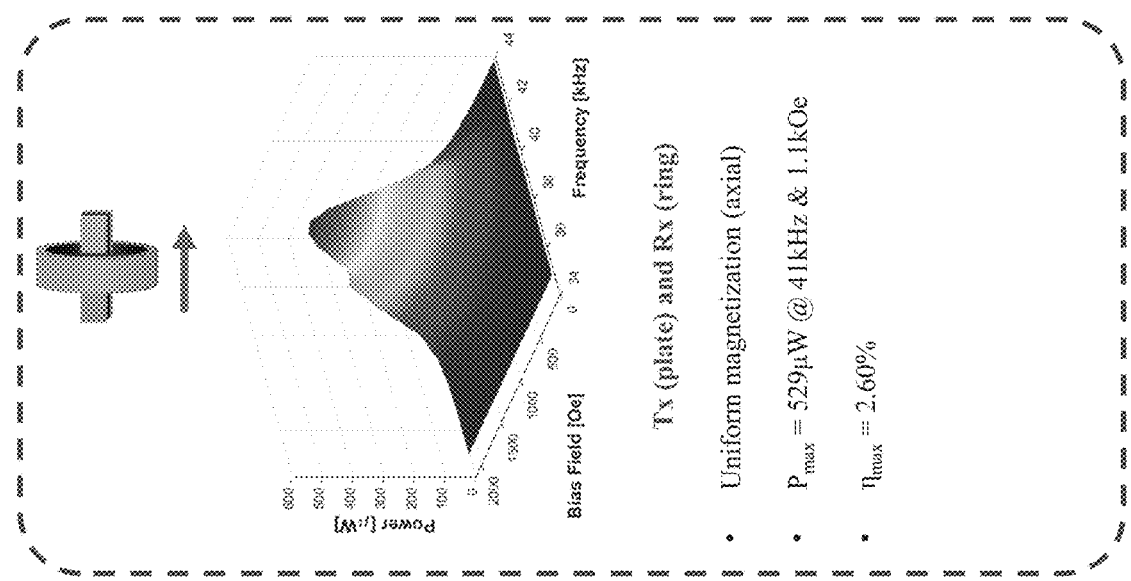

FIG. 17 shows frequency differences between example transmitter and receiver elements, demonstrating that the response can be modulated (due to the capacitance of the laminate plate, the applied wave was not precisely a sine wave).

Figure 18:
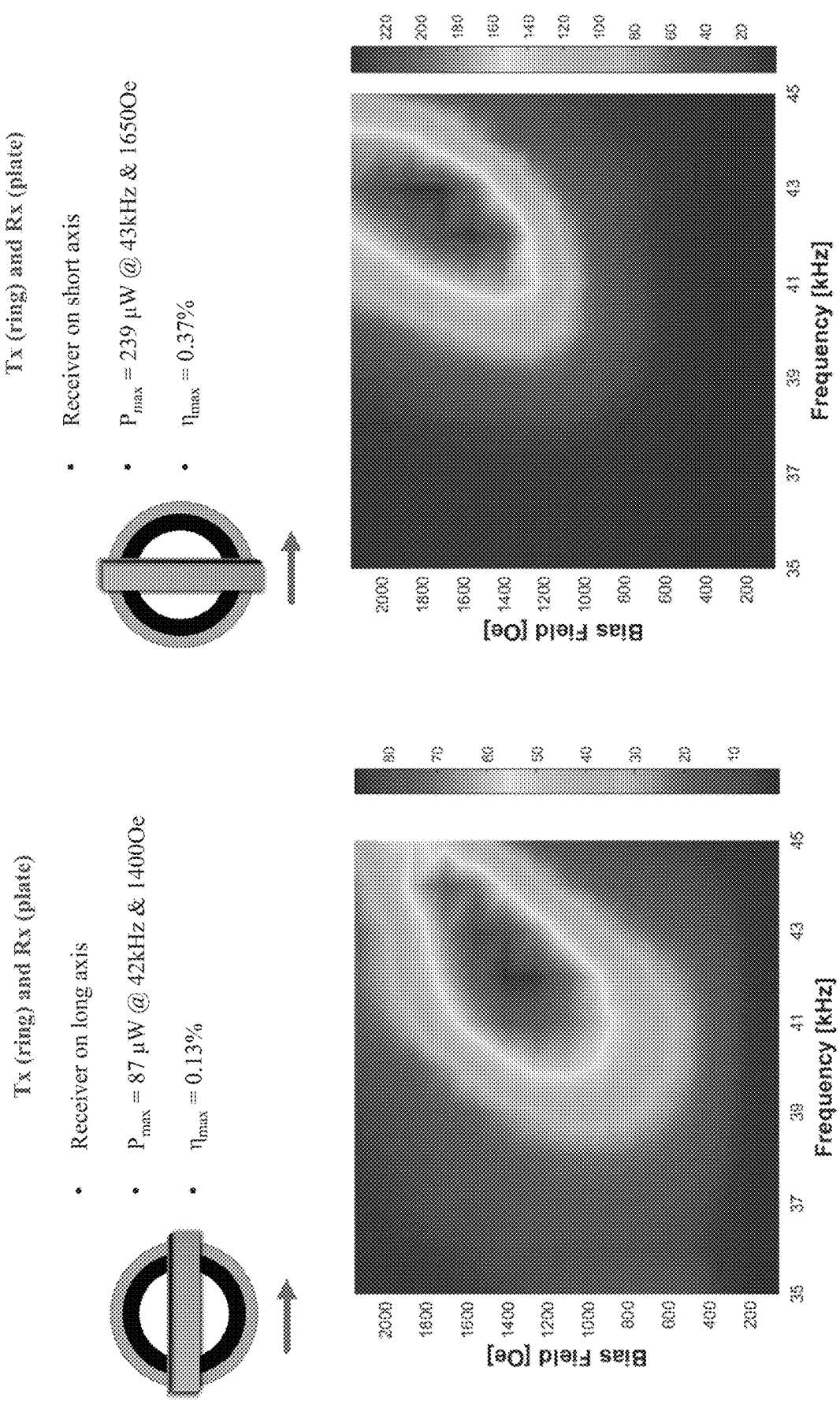
FIG. 18 shows an effect of alignment, where the receiver is on a long axis (left) or a short axis (right).

FIG. 18 shows an effect of alignment, where the receiver is on a long axis (left) or a short axis (right). The short axis alignment is shown to be beneficial for increasing the response.

Figure 19:
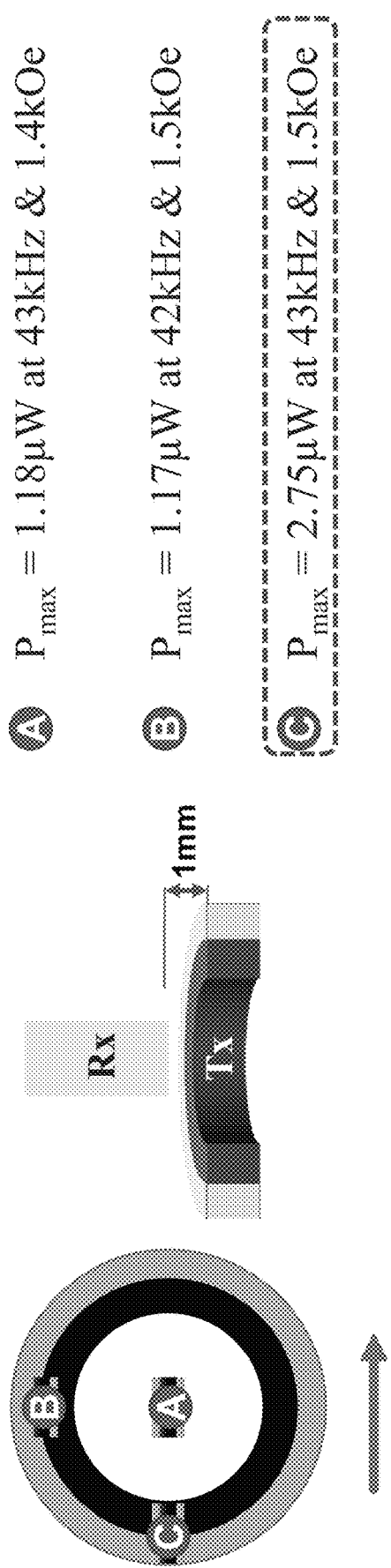
FIG. 19 shows effect of transmitter/receiver alignment on transferred power.
Figure 19:
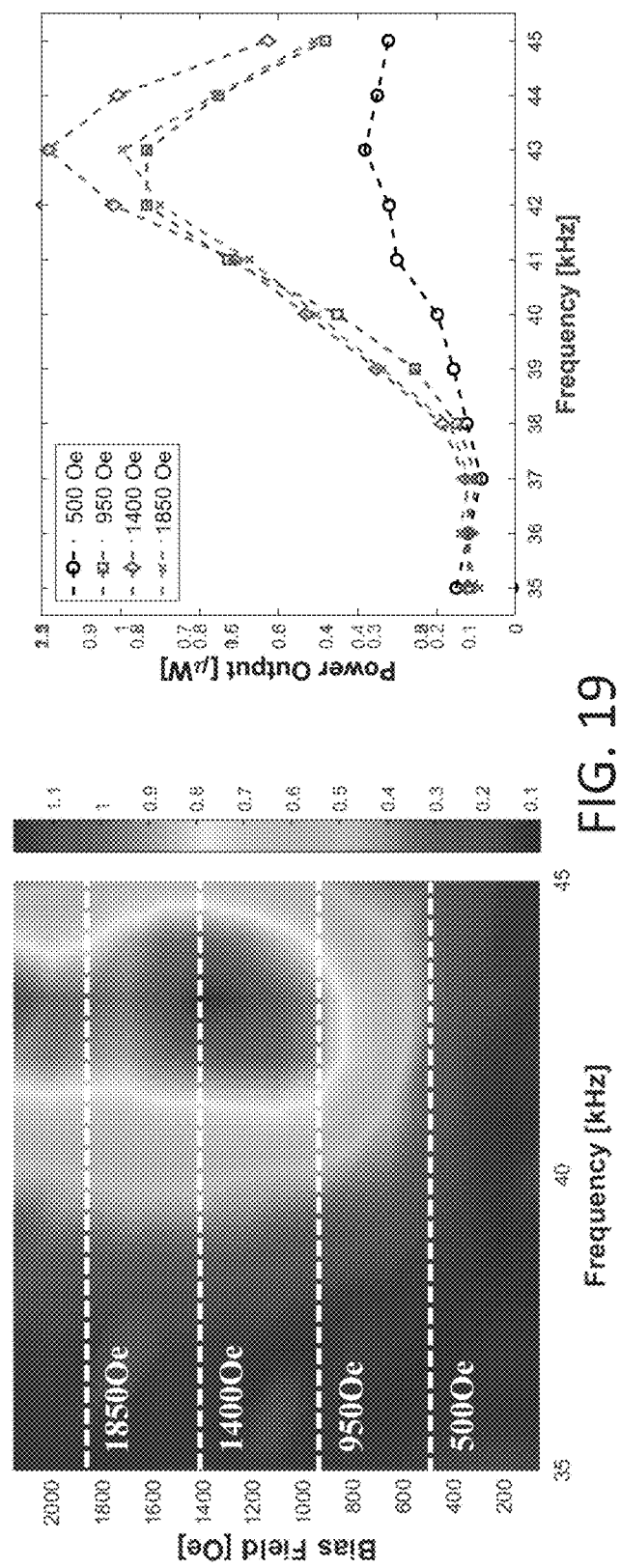

FIG. 19 shows effect of transmitter/receiver alignment on transferred power. The amplitude was 100V. The figure demonstrated that positioning the receiver at a point (C) 1 mm away from the surface resulted in highest transferred power in this example.

Figure 20:
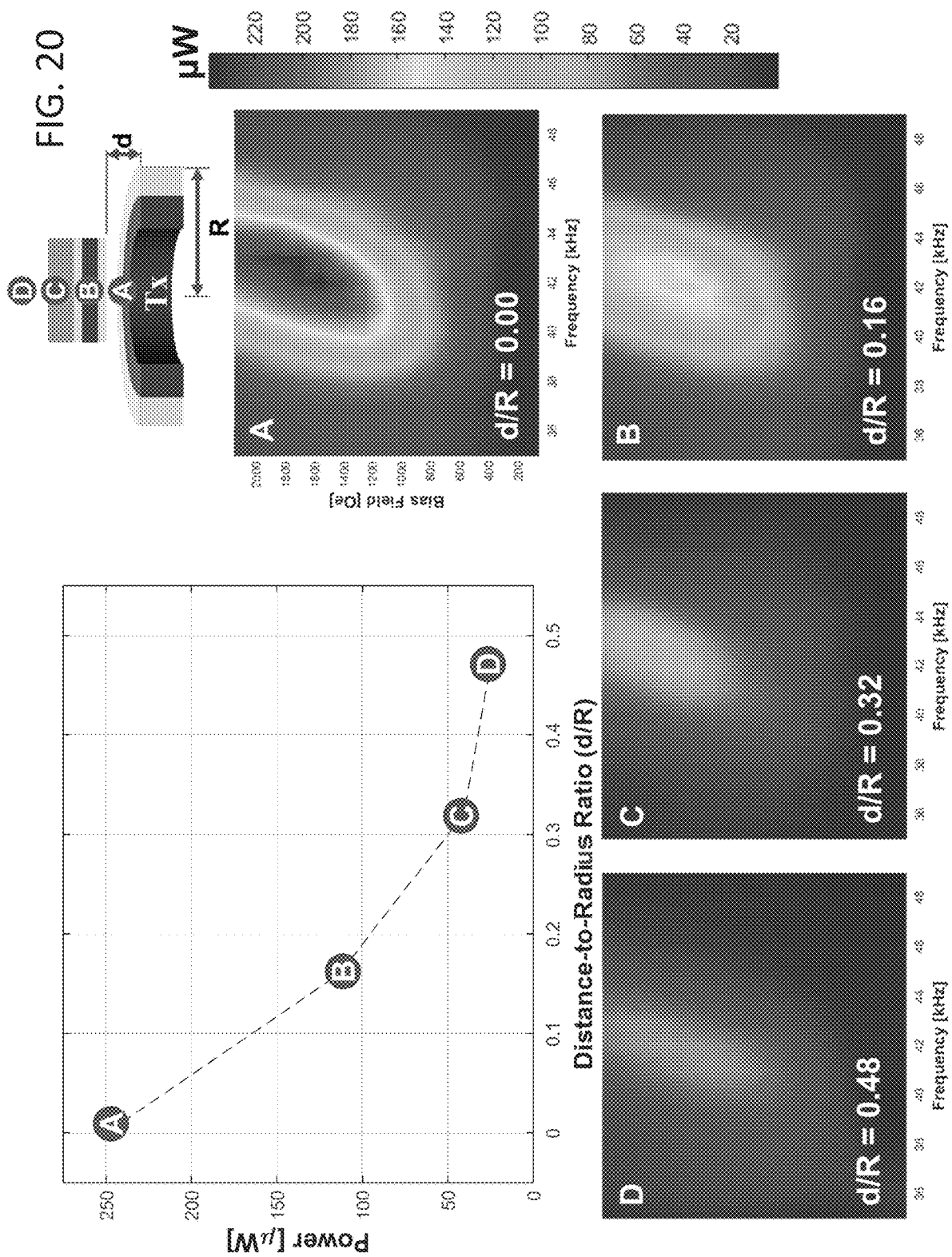
FIG. 20 shows an effect of distance from surface on extracted power, where the proximity is defined as the distance to radius ratio.

FIG. 20 shows an effect of distance from surface on extracted power. The proximity is defined as the distance to radius ratio. The figure shows that the closer to the surface the higher the extracted power.

Figure 21A:
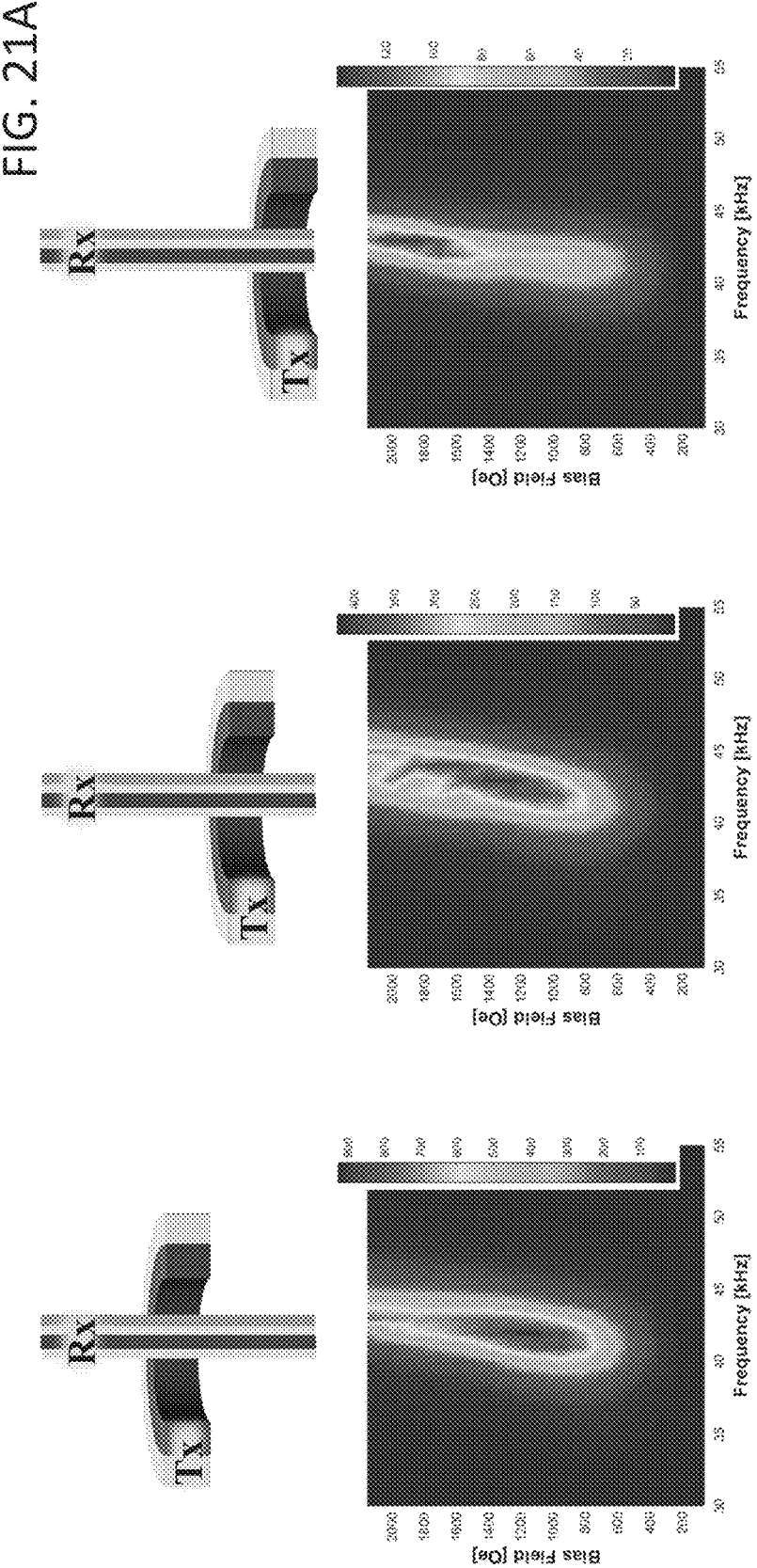
FIGS. 21A-21B show an effect of distance on output power.
Figure 21B:
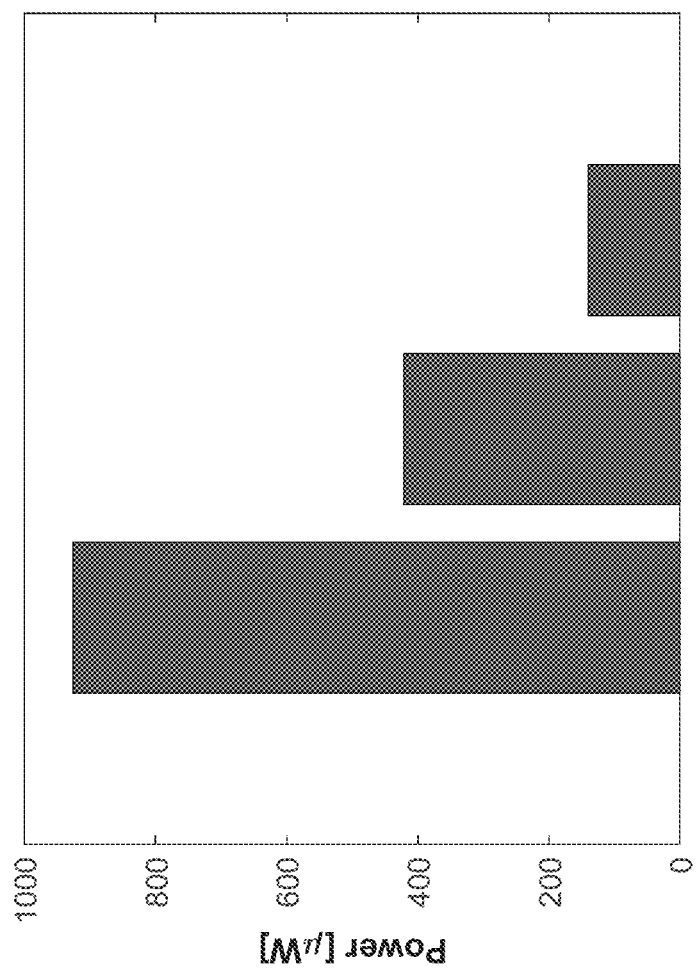

FIGS. 21A-21B show effect of distance on output power. The figures show that receiver engagement provides a higher activated volume, and more power output.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Also, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as a processor, or processors, with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as modules. The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those of ordinary skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, circuits, and process steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in various ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the embodiments discloses herein may be embodied directly in hardware, in a software module executed by a processor, or in a combination of the two. A software module may reside in RAM memory, flash memory, ROM memory, EPROM memory, EEPROM memory, registers, hard disk, solid state disk, optical media (e.g., CD-ROM), or any other form of transitory or non-transitory storage medium known in the art. An exemplary storage medium can be coupled to the processor such that the processor can read information from, and write information to, the storage medium. In the alternative, the storage medium can be integral to the processor. The processor and the storage medium may reside in an ASIC. The ASIC may reside in a user terminal. In the alternative, the processor and the storage medium may reside as discrete components in a user terminal.

Any of the above aspects and embodiments can be combined with any other aspect or embodiment as disclosed here in the Summary, Figures and/or Detailed Description sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About can be understood as within 20%, 19%, 18%, 17%, 16%, 15%, 14%, 13%, 12%, 11%, 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 90%, 95%, 97%, 98%, 99% or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

What is claimed is:

1. A system for near-field wireless energy transfer, having an apparatus comprising:
    a first multilayer composite structure comprising:
    at least one outer layer of a piezoelectric material providing or comprising a piezoelectric phase or a material with or adapted for electromechanical coupling; and at least one inner layer of a magnetostrictive material providing or comprising a magnetostrictive phase or a material with or adapted for a magnetomechanical coupling;

wherein said at least outer layer is joined, adherent to or bonded to at least one of said at least one inner layer; and an electric field generator for applying an electric field to the piezoelectric phase to generate strain, a second multilayer composite structure comprising:

at least one outer layer of a piezoelectric material providing or comprising a piezoelectric phase or a material with or adapted for electromechanical coupling; and at least one inner layer of a magnetostrictive material providing or comprising a magnetostrictive phase or a material with or adapted for a magnetomechanical coupling;

wherein said at least outer layer is joined, adherent to or bonded to at least one of said at least one inner layer;

wherein the second multilayer composite structure is wirelessly coupled to the first multilayer composite for wireless energy transfer, wherein the inner and outer layers of the first multilayer structure define concentric rings;

wherein the inner and outer layers of the second multilayer structure are arranged with respect to one another in a stacking sequence;

wherein the first multilayer structure surrounds the second multilayer structure; and wherein the first, outer multilayer structure provides or comprises a transmitter and the second, inner multilayer structure provides or comprises a receiver;

wherein said transmitter and said receiver are not coupled to one another via conductive media.

2. The system of claim 1, wherein the piezoelectric material is radially polarized.

3. The system of claim 1, wherein the magnetostrictive material comprises a terbium, dysprosium, and/or an iron alloy.

4. A system for near-field wireless energy transfer, having an apparatus comprising:

a first multilayer composite structure comprising:

at least one outer layer of a piezoelectric material providing or comprising a piezoelectric phase or a material with or adapted for electromechanical coupling; and at least one inner layer of a magnetostrictive material providing or comprising a magnetostrictive phase or a material with or adapted for a magnetomechanical coupling;

wherein said at least outer layer is joined, adherent to or bonded to at least one of said at least one inner layer; and an electric field generator for applying an electric field to the piezoelectric phase to generate strain, a second multilayer composite structure comprising:

at least one outer layer of a piezoelectric material providing or comprising a piezoelectric phase or a material with or adapted for electromechanical coupling; and at least one inner layer of a magnetostrictive material providing or comprising a magnetostrictive phase or a material with or adapted for a magnetomechanical coupling;

wherein said at least outer layer is joined, adherent to or bonded to at least one of said at least one inner layer;

wherein the second multilayer composite structure is wirelessly coupled to the first multilayer composite for wireless energy transfer, wherein the inner and outer layers of the second multilayer structure define concentric rings;

wherein the inner and outer layers of the first multilayer structure are arranged with respect to one another in a stacking sequence;

wherein the second multilayer structure surrounds the first multilayer structure;

wherein the first, inner multilayer structure provides or comprises a transmitter and the second, outer multilayer structure provides or comprises a receiver;

wherein said transmitter and said receiver are not coupled to one another via conductive media.

5. The system of claim 4, wherein the piezoelectric material is radially polarized.

6. The system of claim 4, wherein the magnetostrictive material comprises a terbium, dysprosium, and/or an iron alloy.

* * * * *